(12) United States Patent
Balestri et al.

(10) Patent No.: US 9,269,020 B2
(45) Date of Patent: Feb. 23, 2016

(54) IMAGE ANALYSIS

(71) Applicant: TELECOM ITALIA S.p.A., Milan (IT)

(72) Inventors: Massimo Balestri, Turin (IT); Gianluca Francini, Turin (IT); Skjalg Lepsoy, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 42 days.

(21) Appl. No.: 14/370,108

(22) PCT Filed: Dec. 20, 2012

(86) PCT No.: PCT/EP2012/076398
§ 371 (c)(1),
(2) Date: Jul. 1, 2014

(87) PCT Pub. No.: WO2013/102574
PCT Pub. Date: Jul. 11, 2013

(65) Prior Publication Data
US 2015/0036936 A1    Feb. 5, 2015

Related U.S. Application Data

(60) Provisional application No. 61/599,537, filed on Feb. 16, 2012.

(30) Foreign Application Priority Data

Jan. 2, 2012   (IT) ................ MI2012A0003

(51) Int. Cl.
*G06K 9/46* (2006.01)
*G06K 9/62* (2006.01)

(52) U.S. Cl.
CPC ............ *G06K 9/4671* (2013.01); *G06K 9/4642* (2013.01); *G06K 9/6202* (2013.01); *G06K 9/6255* (2013.01); *G06K 9/6256* (2013.01)

(58) Field of Classification Search
None
See application file for complete search history.

(56) References Cited

U.S. PATENT DOCUMENTS

| 2010/0104184 | A1* | 4/2010 | Bronstein | ......... G06F 17/30784 382/170 |
| 2012/0051647 | A1* | 3/2012 | Tan | ...................... G06K 9/6211 382/192 |

OTHER PUBLICATIONS

U.S. App. No. 14/370,098, filed Jul. 1, 2014, Francini, et al.
(Continued)

*Primary Examiner* — Sumati Lefkowitz
*Assistant Examiner* — David Perlman
(74) *Attorney, Agent, or Firm* — Oblon, McClelland, Maier & Neustadt, L.L.P.

(57) ABSTRACT

A method for processing an image including: identifying a first group of keypoints in the image; for each keypoint of the first group, identifying at least one corresponding keypoint local feature related to the each keypoint; for the at least one keypoint local feature, calculating a corresponding local feature relevance probability; calculating a keypoint relevance probability based on the local feature relevance probabilities of the at least one local feature; selecting keypoints, among the keypoints of the first group, having the highest keypoint relevance probabilities to form a second group of keypoints, and exploiting the keypoints of the second group for analyzing the image. The local feature relevance probability calculated for a local feature of a keypoint is obtained by comparing the value assumed by the local feature with a corresponding reference statistical distribution of values of the local feature.

8 Claims, 21 Drawing Sheets

(56) References Cited

OTHER PUBLICATIONS

Office Action issued Aug. 19, 2015 in European Patent Application No. 12 816 273.2.

Gerald Fritz, et al., "A Mobile Vision System for Urban Detection with Informative Local Descriptors", Computer Vision Systems IEEE (ICVS) XP010899383, 2006, 9 pages.

Pawan K. Baheti, et al., "Information-Theoretic Database Building and Querying for Mobile Augmented Reality Appiications" IEEE International Symposium on Mixed and Augmented Reality (ISMAR), XP032201434, Oct. 2011, pp. 47-53.

Xiang Wang, et al., "Good Image Features for Bearing-oniy SLAM", IEEE International Conference on Intelligent Robots and Systems, XP031006487, Oct. 2006, pp. 2576-2581.

Panu Turcot, et al., "Better matching with fewer features: The selection of useful features in large database recognition problems", IEEE International Conference on Computer Vision Workshops (ICCV), XP031664571, 2009, pp. 2109-2116.

Cai, H. et al. "Learning Weights for Codebook in Image Classification and Retrieval" IEEE, pp. 2320-2327, 2010 (XP 031725747).

Jurie, F. et al. "Creating Efficient Codebooks for Visual Recognition" Proceedings of the Tenth IEEE international Conference on Computer Vision (ICCV'05), IEEE, 7 Pages, 2005 (XP 010854841).

Tirilly, P. et al. "A review of weighting schemes for bag of visual words image retrieval" Publications Internes de l'IRISA, pp. 1-47, 2009 (XP 055006510).

Lepsoy, S. et al. "Statistical Modelling of Outliers for Fast Visual Search" IEEE, 6 Pages, 2011 (XP 031964858).

Marszalek, M. et al. "Spatial Weighting for Bag-of-Features" Proceedings of the 2006 IEEE Computer Society Conference on Computer Vision and Pattern Recognition (CVPR'06), IEEE, 8 Pages, 2006 (XP010923114).

International Search Report Issued Feb. 12, 2013 in PCT/EP12/076398 Filed Dec. 20, 2012.

* cited by examiner

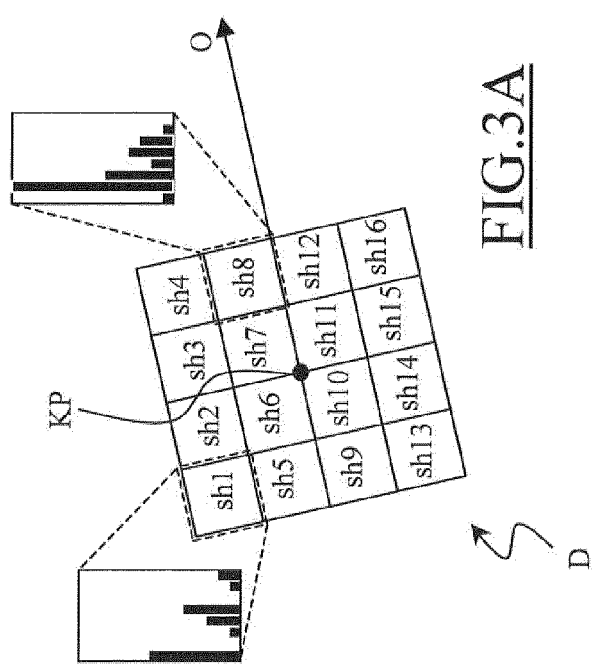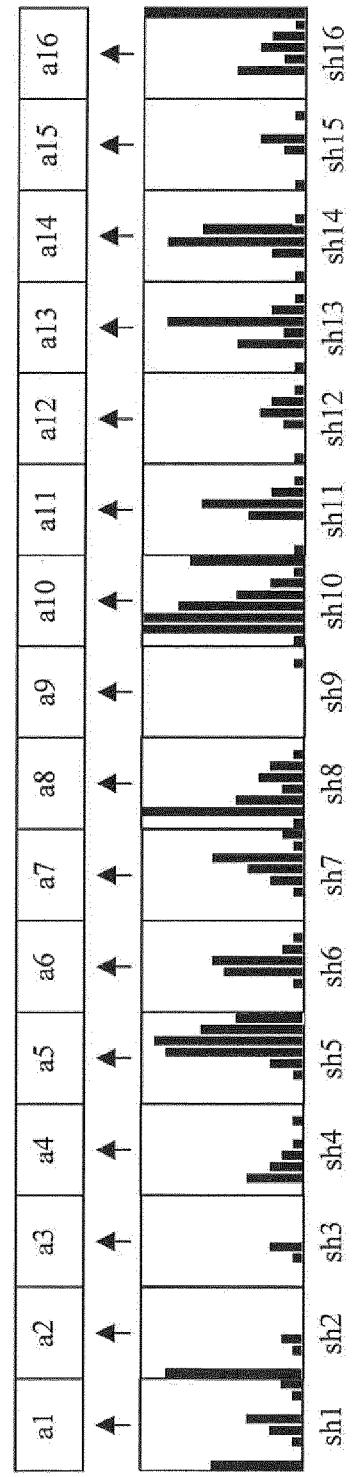

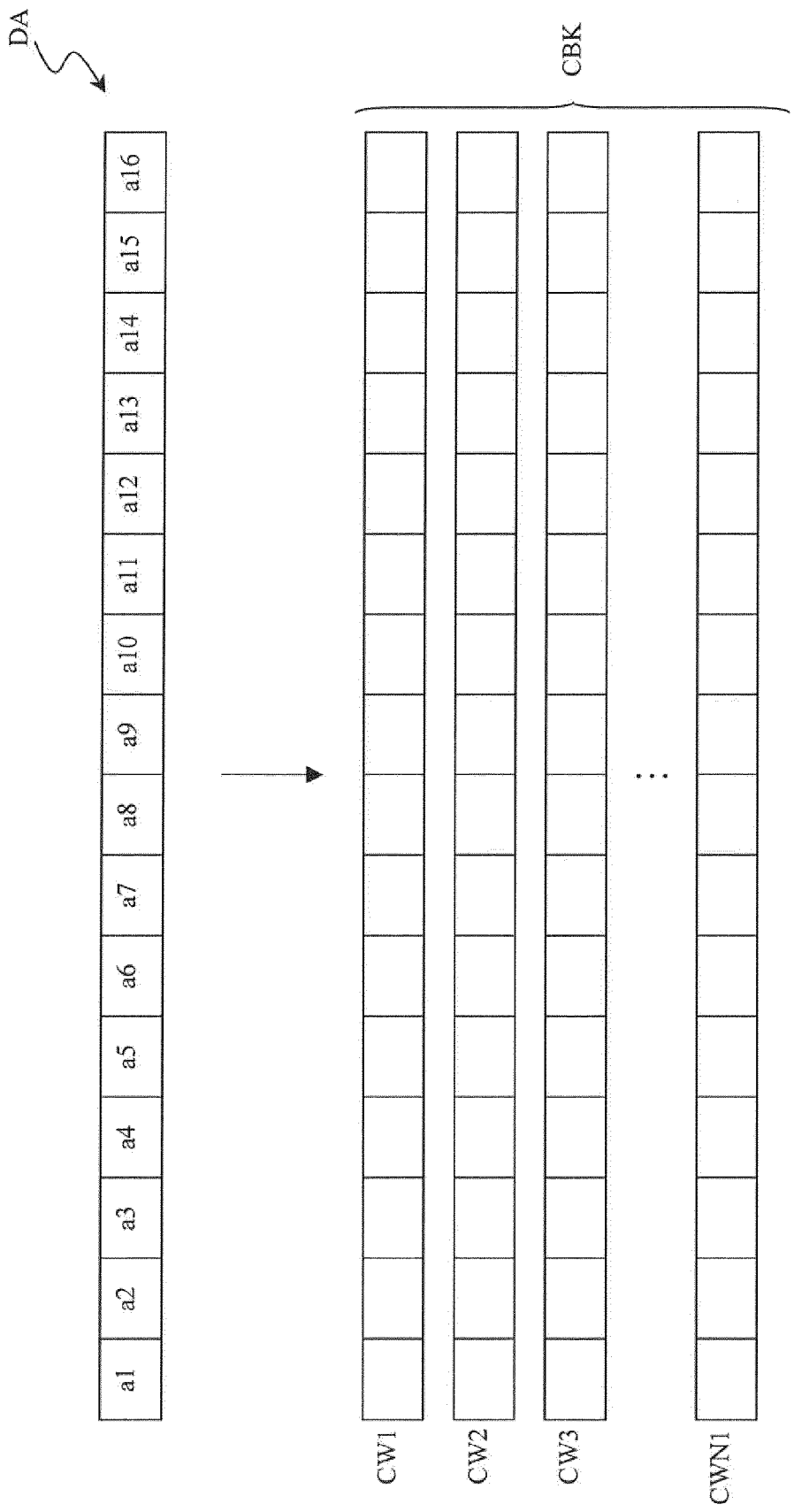

IMAGE ANALYSIS

BACKGROUND OF THE INVENTION

1. Field of the Invention

The present invention relates to the field of the image analysis.

2. Description of the Related Art

In the field of the image analysis, a common operation provides for comparing two images in order to find the relation occurring therebetween in case both the images include at least a portion of a same scene or of a same object.

Among a high number of applications, the image comparison is of the utmost importance for calibrating video cameras belonging to a multi-camera system, for assessing the motion occurring between two frames of a video shoot, and for the recognition of an object within an image (e.g., a picture). The latter application is now assuming more and more importance due to the recent development of object recognition algorithms specifically designed to be employed in the so-called visual searching engines, i.e., automated services that, starting from a picture, are capable of identifying the object(s) pictured therein and offering information related to the identified object(s). Examples of known services of this type include Google Goggles, Nokia Point&Find, and kooaba Smart Visuals. An object recognition application typically provides for comparing a first image—in jargon, referred to as "query image"—depicting an object to be recognized with a plurality of model images, each one depicting a respective known object; this allows to perform a comparison among the object depicted in the query image and the objects depicted in the model images.

The model images are typically arranged in a proper model database. For example, in case the object recognition is exploited in an online shopping scenario, each model image corresponds to an item offered by an online store (e.g., the picture of a book cover, a DVD cover and/or a CD cover). The number of model images included in a database of such type is quite high; for example, a model database of an online shopping service may include several millions of different model images.

A very efficient way for performing comparing operations between two images provides for selecting a set of points—in jargon, referred to as keypoints—in the first image and then matching each keypoint of the set to a corresponding keypoint in the second image. The selection of which point of the first image has to become a keypoint is advantageously carried out by extracting local features of the area of the image surrounding the point itself, such as for example the point extraction scale, the privileged orientation of the area, and the so called "descriptor". In the field of the image analysis, a descriptor of a keypoint is a mathematic operator describing the luminance gradient of an area of the image (called patch) centered at the keypoint, with such patch that is orientated according to the main luminance gradient of the patch itself.

In "Distinctive image features from scale-invariant keypoints" by David G. Lowe, *International Journal of computer vision*, 2004, a Scale-Invariant Feature Transform (SIFT) descriptor has been proposed; briefly, in order to allow a reliable image recognition, the SIFT descriptors are generated taking into account that the local features extracted from the image corresponding to each keypoint should be detectable even under changes in image scale, noise and illumination. The SIFT descriptors are thus invariant to uniform scaling, orientation, and partially invariant to affine distortion and illumination changes.

The SIFT descriptor is a quite powerful tool, which allows to select keypoints for performing accurate image comparisons. However, this accuracy can be achieved only with the use of a quite large amount of data; for example, a typical SIFT descriptor is an array of 128 data bytes. Since the number of keypoints in each image is relatively high (for example, 1000-1500 keypoints for a standard VGA picture), and since each keypoint is associated with a corresponding SIFT descriptor, the overall amount of data to be processed may become excessive for being efficiently managed.

This drawback is exacerbated in case the scenario involves the use of mobile terminals (e.g., identification of objects extracted from pictures taken by the camera of a smartphone). Indeed, since the operations to be performed for carrying out the image analysis are quite complex and demanding in terms of computational load, in this case most of the operations are usually performed at the server side; in order to have all the information required to perform the analysis, the server needs to receive from the mobile terminal all the required data, including the SIFT descriptors for all the keypoints. Thus, the amount of data to be transmitted from the terminal to the server may become excessive for guaranteeing a good efficiency of the service.

According to a solution known in the art, such as for example the one employed by Google Goggles, this drawback is solved at the root by directly transmitting the image, and not the descriptors, from the mobile terminal to the server. Indeed, because of the quite high number of keypoints, the amount of data of the corresponding SIFT descriptors may exceed the size (in terms of bytes) of a standard VGA picture itself.

SUMMARY OF THE INVENTION

The Applicant has found that the approaches known in the art are not efficient, still requiring the management of a high amount of data and/or the concentration of a large portion of the operations on the server side, limiting the scalability of the system and the overall performances.

For example, the solution employed by Google Goggles, which provides for directly transmitting the image—and not the descriptors—from the mobile terminal to the server requires that the entire computational load is moved toward the server, which may become overburden. Moreover, the transmission of the compressed image still requires a considerable amount of data (e.g., tens of Kbytes for a VGA image).

The Applicant has tackled the problem of how to improve these approaches in terms of amount of data to be processed.

In particular, the Applicant has tackled the problem to provide a method for processing an image which requires a reduced amount of data to be managed.

The Applicant has found that the amount of data to be processed for performing image analysis procedures can be advantageously reduced by selecting an optimal subset of keypoints—among the keypoints identified in the image—according to local feature relevance probabilities calculated based on reference statistical distributions.

According to an aspect of the present invention, a method for processing an image is proposed. The method comprises identifying a first group of keypoints in the image. For each keypoint of the first group, the method provides for identifying at least one corresponding keypoint local feature related to said each keypoint; for said at least one keypoint local feature, calculating a corresponding local feature relevance probability; calculating a keypoint relevance probability based on the local feature relevance probabilities of said at least one local feature. The method further comprises selecting keypoints, among the keypoints of the first group, having the highest keypoint relevance probabilities to form a second group of keypoints, and exploiting the keypoints of the second group for analysing the image. The local feature relevance probability calculated for a local feature of a keypoint is obtained by comparing the value assumed by said local feature with a corresponding reference statistical distribution of values of said local feature.

According to an embodiment of the present invention, each said corresponding reference statistical distribution is statistically equivalent to a corresponding statistical distribution generated by collecting, among a plurality of reference keypoints identified in a plurality of reference image pairs, the local feature values corresponding to those reference keypoints of each reference image pair that have been ascertained to involve a correct feature match between the reference images of such pair.

Preferably, said at least one of keypoint local feature related to said each keypoint comprises at least one among the coordinates of the keypoint, the scale at which the keypoint has been identified, the dominant orientation of the keypoint, the peak of the keypoint, and a descriptor of the keypoint.

According to an embodiment of the present invention each reference statistical distribution is arranged in the form of a corresponding histogram having a plurality of bins. Each bin corresponds to a predefined range of values of the corresponding local feature. The frequency of each bin corresponds to a ratio between:
 a) the number of reference keypoints that have been ascertained to involve a correct feature match and having a value of the corresponding local feature that falls within said bin, and
 b) the total number of reference keypoints having a value of the corresponding local feature that falls within said bin.

According to an embodiment of the present invention, said calculating the local feature relevance probability for a local feature of a keypoint comprises inspecting the histogram corresponding to such local feature in order to identify the bin thereof fitting the value assumed by the local feature of the keypoint, and setting the local feature relevance probability to the frequency of the identified bin.

Advantageously, said calculating a keypoint relevance probability of a keypoint of the first group includes combining the local feature relevance probabilities of each one of said at least one local feature of the corresponding keypoint.

Preferably, said calculating a keypoint relevance probability of a keypoint of the first group includes multiplying one to another the local feature relevance probabilities of each one of said at least one local feature of the corresponding keypoint.

Another aspect of the present invention provides for a system for processing an image. Said system comprises a first processing unit configured to identify a first group of keypoints in the image, and second processing unit configured to perform the following operations for each keypoint of the first group:
 a) identifying at least one corresponding keypoint local feature related to said each keypoint;
 b) for said at least one keypoint local feature, calculating a corresponding local feature relevance probability;
 c) calculating a keypoint relevance probability based on the local feature relevance probabilities of said at least one local feature.

The system further comprises a third processing unit configured to select keypoints, among the keypoints of the first group, having the highest keypoint relevance probabilities to form a second group of keypoints, and a fourth processing unit configured to exploit the keypoints of the second group for analysing the image. The local feature relevance probability calculated for a local feature of a keypoint is obtained by comparing the value assumed by said local feature with a corresponding reference statistical distribution of values of said local feature.

A still further aspect of the present invention relates to a method for generating a reference statistical distribution of values of a keypoint local feature.

BRIEF DESCRIPTION OF THE DRAWINGS

These and other features and advantages of the present invention will be made evident by the following description of some exemplary and non-limitative embodiments thereof, to be read in conjunction with the attached drawings, wherein:

FIG. 3A illustrates an exemplary descriptor of the SIFT type;

FIG. 3B illustrates an exemplary descriptor array of the descriptor of FIG. 3A;

FIG. 4A illustrates an exemplary descriptor array compression according to a solution known in the art;

DETAILED DESCRIPTION OF EXEMPLARY EMBODIMENTS OF THE INVENTION

Figure 1:
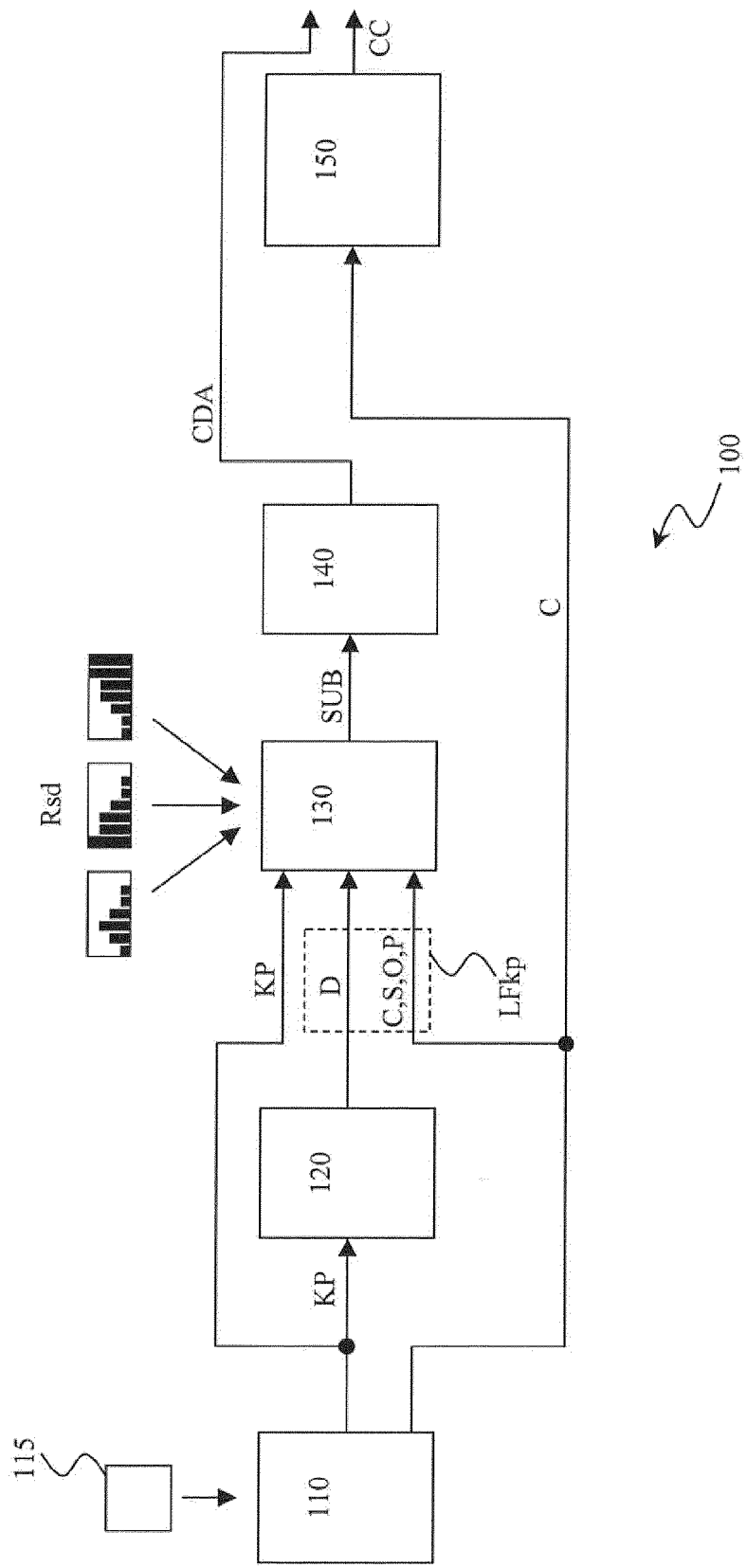
FIG. 1 illustrates in terms of functional blocks an extraction procedure directed to extract from a query image an optimal set of keypoints and generate a compressed set of descriptors according to an embodiment of the present invention.

Extraction Procedure (FIG. 1)

FIG. 1 illustrates in terms of functional blocks a procedure, hereinafter referred to as "extraction procedure" and identified with the reference 100, directed to process an input image in order to obtain an optimal set of keypoints and generate a corresponding set of descriptors according to an embodiment of the present invention. The keypoints and the descriptors will be then exploited for image analysis purposes. In the following of the present description, the generic expressions "image analysis" and "analyzing an image" have to be intended to comprise all those operations which provide for comparing an image with at least one another image. These operations may be carried out in a wide variety of applications, such as for example in an object recognition application, as well as in an application providing for the creation of a single panoramic picture starting from a plurality of different pictures.

As will be described later on, the extraction procedures according to an embodiment of the present invention further provides for selecting an optimal subset of keypoints and compressing the descriptors of such keypoints to an extent such to greatly improve the efficiency of subsequent procedures.

The steps of the extraction procedure 100 described in this section may be carried out by proper processing units, whose structure and function depends on the specific field of application to which they are destined. For example, each processing unit may be a hardware unit specifically designed to perform one or more steps of the method. Moreover, the steps of the method may be carried out by a programmable machine (e.g., a computer) under the control of a corresponding set of instructions.

Keypoints Extraction (Phase 110)

The first phase 110 of the extraction procedure 100 provides for receiving a query image 115 and extracting therefrom a first set of keypoints KP, each one associated with a corresponding pair of spatial coordinates C identifying the location of such keypoint KP within the query image 115.

This operation may be carried out by exploiting the known Difference of Gaussians (DoG) keypoint extraction algorithm; however, similar considerations apply in case different keypoint extraction algorithms are employed, such as for example the Determinant of the Hessians (DoH) keypoint extraction algorithm. Making reference to the DoG keypoint extraction algorithm, the query image 115 is convolved with Gaussian filters in a sequence at different scales. Then, a difference operation is carried out between pairs of adjacent Gaussian-blurred images in the sequence. The keypoints KP are then chosen as the points having maximum/minimum values of Difference of Gaussian (DoG) at multiple scales. Particularly, each pixel in a DoG image is compared to its eight neighbors at the same scale and to nine neighboring pixels at each of the neighboring scales (i.e., the subsequent and the previous scales in the sequence). If the pixel value is the maximum or minimum among all compared pixels, that point is considered a candidate keypoint KP.

The phase 110 also provides that each keypoint KP is assigned to one or more orientations based on local image luminance gradient directions. For example, an orientation histogram with a plurality of bins is formed, with each bin covering a corresponding degree interval. Each sample in the neighboring window added to a histogram bin is weighted by its gradient magnitude and by a Gaussian-weighted circular window. The peaks in the resulting histogram correspond to dominant orientations. Once the histogram is filled, the orientations corresponding to the highest peak and local peaks that are within 80% of the highest peaks are assigned to the keypoint KP. In case of multiple orientations have been assigned, an additional keypoint KP is created having the same location and scale as the original keypoint for each additional orientation.

At the end of phase 110 a set of keypoints KP is thus generated, together with the corresponding coordinates C, the scale S at which the keypoint is extracted, its dominant orientation O, and the peak P, i.e., the absolute value of the DoG corresponding to such keypoint (which is indicative of the contrast thereof).

Descriptors Generation (Phase 120)

The following phase 120 provides to process the query image 115 in order to compute for each keypoint KP a corresponding descriptor D. In the example at issue, the descriptors D computed at phase 120 are descriptor of the SIFT type. While the keypoints KP have been extracted in such a way to ensure invariance to image location, scale and rotation, the SIFT descriptors D are computed in such a way to be highly distinctive and partially invariant to illumination and viewpoint. Specifically, for each keypoint KP a set of 16 sub-histograms are calculated on a 4×4 grid that is centered at the keypoint KP location and orientated according to the dominant orientation of the keypoint KP. Each sub-histogram includes 8 bins, each one corresponding to an orientation having an angle $n*\pi/4 (n=0, 1, \ldots 7)$ with respect to the dominant orientation; the frequency of each bin of a sub-histogram is proportional to the luminance gradient of the grid cell (hereinafter referred to as sub-region) corresponding to such sub-histogram, considered along the direction identified by such bin. The values of such orientation histograms are arranged in an array, forming the descriptor D of the keypoint KP. Since there are 4×4=16 sub-histograms each with 8 bins, the descriptor D is an array having 128 items.

The concepts of the present invention are also applicable if the SIFT descriptor is calculated on a grid including a different number of cells, and/or with a different number of bins per histogram.

Moreover, even if in the example at issue reference has been made to descriptors of the SIFT type, similar considerations apply in case different types of descriptors are employed, such as for example the Speeded Up Robust Feature (SURF) and the Histogram of Oriented Gradients (HOG), or possibly others. Furthermore, even if reference has been made and will be made in the following to descriptors comprising data relating to luminance gradients, similar considerations apply if gradients of different parameters are considered. Indeed, as it is well known to those skilled in the art, the luminance is only one of the physical properties of the color. Thus, even if the luminance has been ascertained to be the best (i.e., the most robust) physical property to be considered for image analysis purposes, different types of descriptors may be also considered, for example comprising data relating to chrominance gradients, saturation gradients, or even color (which includes both luminance, saturation and chrominance) gradients.

As already mentioned above, carrying out image analysis operations involves the management of a quite large amount of data: indeed, each keypoint KP is associated with a plurality of local features (hereinafter globally identified with reference LFkp), including the coordinates C, the scale S, the dominant orientation O, and the peak P, as well as a corresponding descriptor D formed by an array of 128 items. For this purpose, in order to reduce the overall amount of data to be managed (e.g., to be memorized and/or transmitted), the extraction procedure 100 according to an embodiment of the present invention provides for two expedients, i.e.:

1) reducing the number of the previously generated keypoints KP by selecting the most relevant keypoints KP (from the image comparison point of view), in order to obtain an optimal subset SUB of keypoints KP, and
2) properly compressing both the coordinates C and the descriptors D.

Phase 130 of the extraction procedure 100 is dedicated to the selection of the optimal subset SUB, phase 140 is dedicated to the compression of the descriptors D, and phase 150 is dedicated to the compression of the coordinates C.

Selection of the Optimal Subset of Keypoints (Phase 130)

According to an embodiment of the present invention, the selection of the optimal subset SUB is carried out by calculating for at least one local feature LFkp—the coordinates C, the scale S, the dominant orientation O, the peak P and the descriptor D—of each keypoint KP of the query image 115 at least one corresponding feature relevance probability FRP, sorting the keypoints KP according to a keypoint relevance probability KRP based on the feature relevance probabilities FRP of its local features LFkp, and then selecting the keypoints KP having the highest keypoint relevance probabilities KRP.

According to an embodiment of the present invention, the feature relevance probability FRP of each local feature LFkp of the generic keypoint KP is calculated by exploiting a corresponding reference statistical distribution Rsd, which has been already predetermined in advance after having carried out statistical evaluations on a benchmark image database.

The reference statistical distributions Rsd are made in such a way to reflect the statistical behavior of the local features LFkp of keypoints KP considered useful for image analysis purposes.

For example, in case of object recognition procedures, the benchmark image database is a database comprising a plurality of image pairs, with each image pair consisting of two pictures depicting a same object/scene. According to an embodiment of the present invention, the reference statistical distributions are generated in the following way.

Keypoints are firstly extracted from all the images of the benchmark database. Then, a first statistical analysis is carried out on one or more selected local features of all the extracted keypoints, so as to generate first statistical distributions of such selected local features. Each first statistical distribution of a local feature is arranged in the form of a histogram, obtained by counting the number of keypoints (keypoints frequency)—among the totality of keypoints extracted from the images of the benchmark database—having a value of such local feature that falls within each of a plurality predefined local feature value intervals (bin). Then, for each image pair, keypoints of one picture are matched with keypoints of the other picture. The matches among such keypoints are processed using an image comparison procedure (such as any one among the known image comparison procedures based on image feature matching) in order to identify which match is correct (inlier) and which is incorrect (outlier). A second statistical analysis is then carried out on the same feature or features previously considered in order to generate the reference statistical distributions Rsd to be used for calculating the feature relevance probabilities FRP. This time, the generation of the reference statistical distributions Rsd is carried out by calculating for each bin a ratio between the number of keypoints belonging to inliers and having a value of the corresponding local feature that falls within said bin, and the total number of keypoints (both belonging to inliers and outliers) having a value of the corresponding local feature that falls within the same bin. The Applicant has observed that the first statistical distributions and the reference statistical distributions Rsd are quite different to each other. Since the reference statistical distributions Rsd are generated taking into account the keypoints that involve a correct feature match (inlier), the Applicant has found that such statistical distributions are good representatives of the statistical behavior of keypoints (hereinafter, "relevant keypoints") which are relevant for image analysis purposes, and particularly suited for being efficiently employed in an image comparison procedure.

FIGS. 2A-2F illustrate some statistical distributions Rsd of corresponding selected local features LFkp of keypoints KP according to some exemplary embodiments of the present invention. In particular, the statistical distributions Rsd of FIGS. 2A-2F have been generated from images of a benchmark database specifically arranged for object recognition applications. Should a different image analysis application be considered, such as for example the creation of a single panoramic picture starting from a plurality of different pictures, the images of the benchmark, and therefore, the resulting statistical distributions Rsd would be different.

Figure 2A:
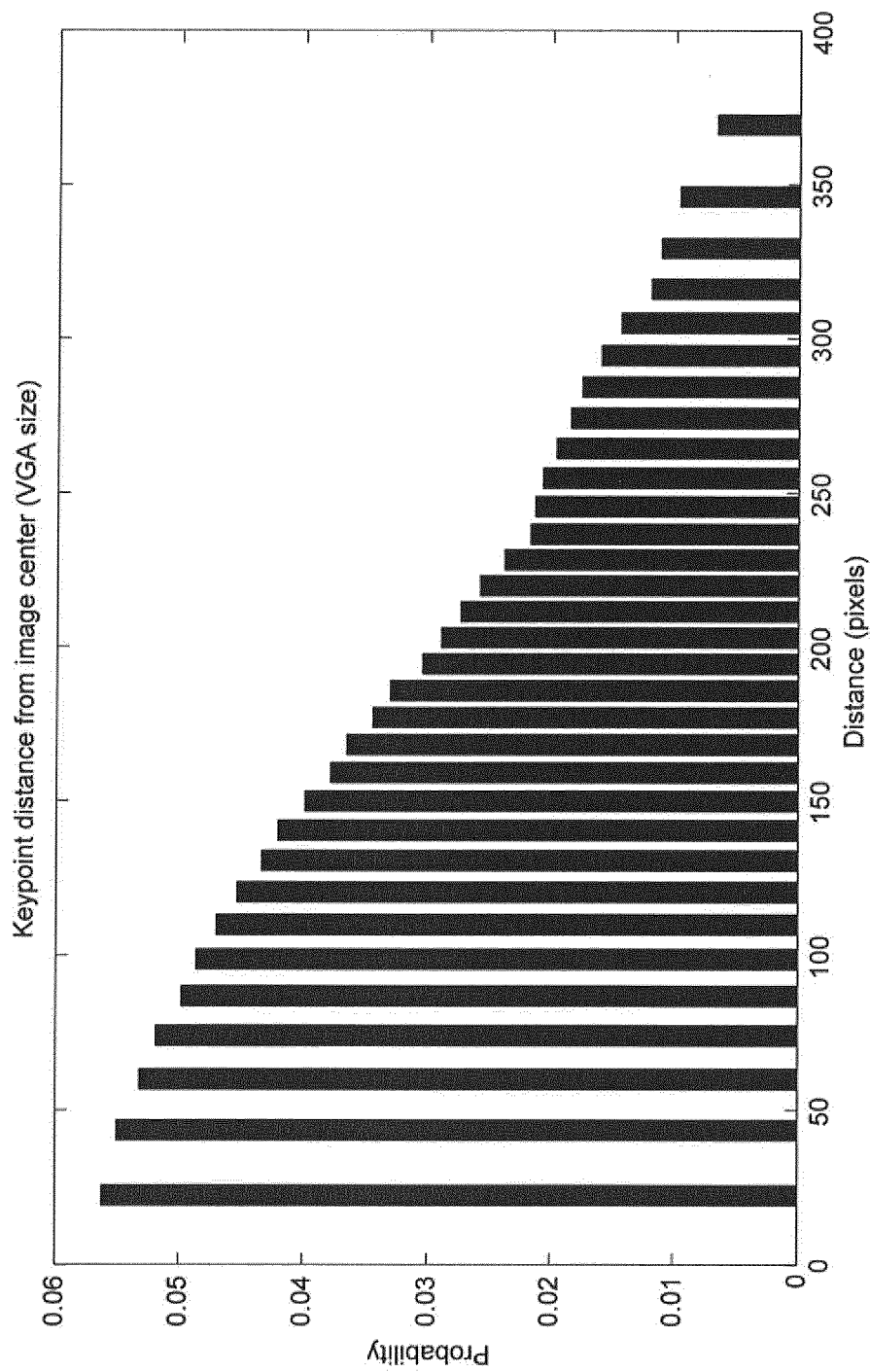
FIGS. 2A-2F are statistical distributions of corresponding selected local features of keypoints according to some exemplary embodiments of the present invention.

FIG. 2A is a statistical distribution Rsd related to the coordinates C of the keypoints KP. Each bin of the corresponding histogram represents the distance (in pixel) of the generic keypoint KP from the center of the image. In the example at issue, the considered image is of the VGA type (i.e., having a resolution of 640×480), thus the center corresponds to the coordinate (320, 240). According to the histogram illustrated in FIG. 2A, the bin having the highest keypoints KP frequency is the one corresponding to the center of the image. This means that the closer a keypoint KP is to the center, the higher the probability that such keypoint KP is a relevant keypoint; the trend of the histogram frequencies monotonically decreases as the distance from the center increases. This could be easily explained by the fact that when an object is photographed, it is highly probable that said object is framed in the center of the picture. It has to be appreciated that in this case the bins of the histogram do not have all the same widths; this is due to the fact that the width of each bin has been properly determined by a (scalar and/or vector) quantizer in such a way to compute few bins, avoiding thus the occurrence of overfitting phenomenon occurrences. The concepts of the present invention also apply in case a (scalar and/or vector) uniform quantization is employed, i.e., with all the bins of the histogram that have a same width.

Figure 2B:
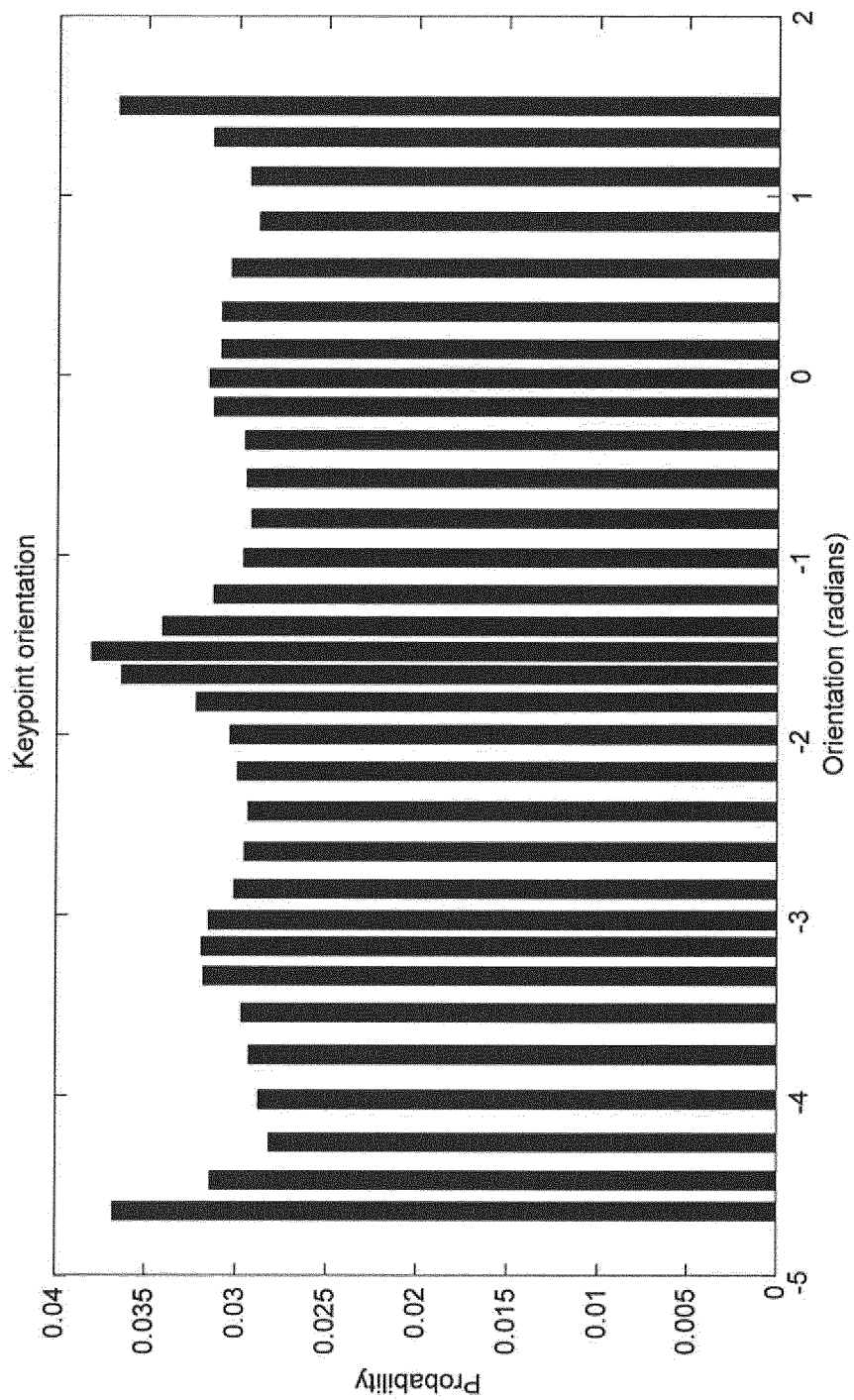

FIG. 2B is a statistical distribution Rsd related to the dominant orientation O of the keypoints KP. Each bin of the corresponding histogram represents the angle (in radians) of the dominant direction of the generic keypoint KP with respect to the horizon (corresponding to 0 radians). According to the histogram illustrated in FIG. 2B, the bins having the highest keypoints KP frequencies are the ones corresponding to the orientations which are parallel or perpendicular to the horizon orientation (i.e., corresponding to $\pi/2$, 0, $-\pi/2$, $-\pi$). This means that the closer the orientation of a keypoint KP is to one of said orientations, the higher the probability that such keypoint KP is a relevant keypoint. This could be explained by the fact that when an object is photographed, it is highly probable that said object is framed so as to mainly extend parallel and/or perpendicular to the horizon line. In this case as well, the width of the bins is determined by means of a quantizer.

Figure 2C:
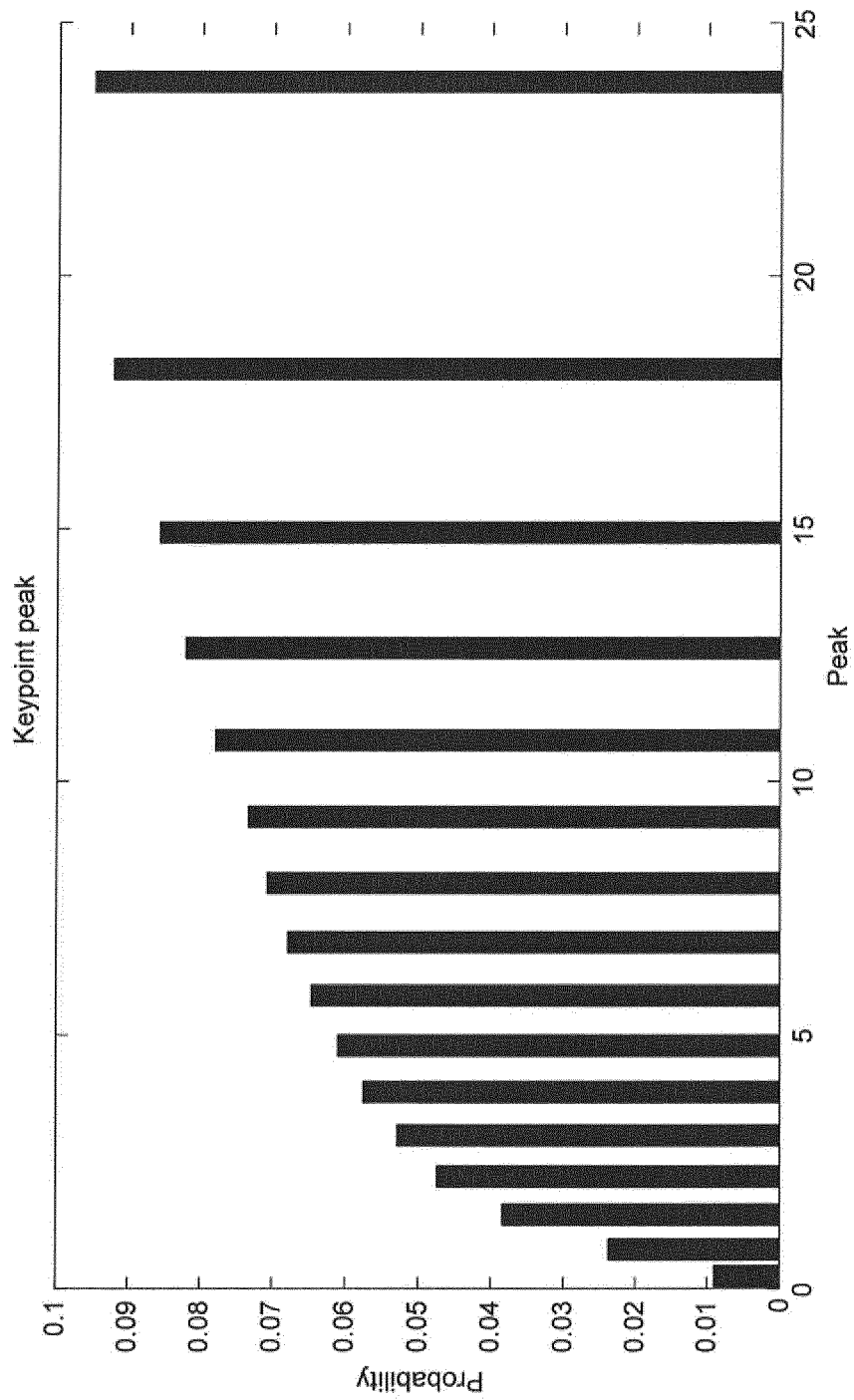

FIG. 2C is a statistical distribution Rsd related to the peak P of the keypoints KP. Each bin of the corresponding histogram represents the contrast between the generic keypoint KP and the most similar point among the neighbor ones. According to the histogram illustrated in FIG. 2C, the bin having the highest keypoints KP frequency is the one corresponding to the highest peak values. This means that the higher the contrast of a keypoint KP, the higher the probability that such keypoint KP is a relevant keypoint; the trend of the histogram frequencies monotonically increases as the contrast increases. This could be easily explained by the fact that a point of a picture having a high contrast is easily recognizable and identifiable. In this case as well, the width of the bins is determined by means of a quantizer.

Figure 2D:
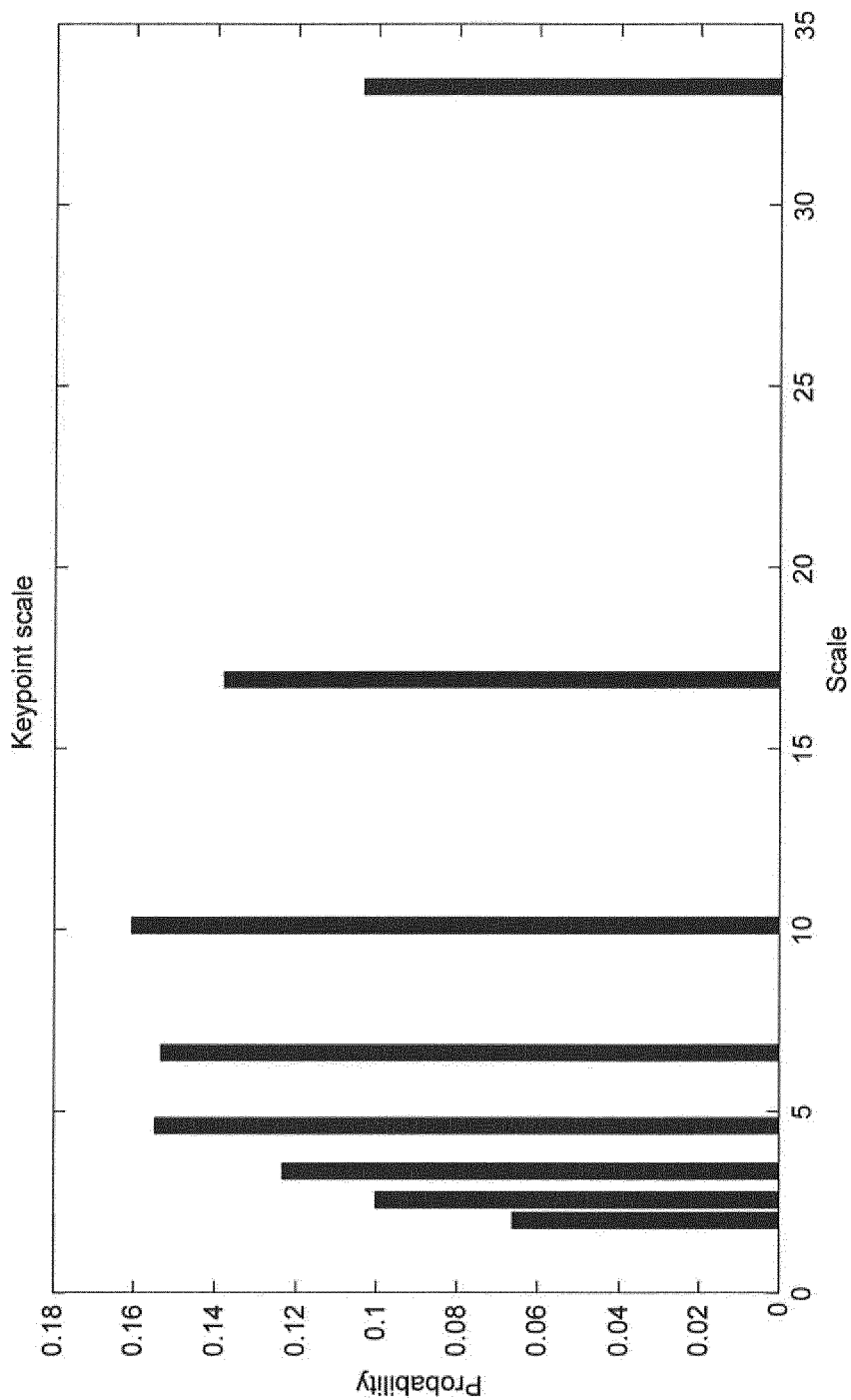

FIG. 2D is a statistical distribution Rsd related to the scale S of the keypoints KP. Each bin of the corresponding histogram represents a particular scale S at which the keypoint KP may be extracted. According to the histogram illustrated in FIG. 2D, the bin having the highest keypoints KP frequency corresponds to a mid-low scale. In this case as well, the width of the bins is determined by means of a quantizer.

Figure 2E:
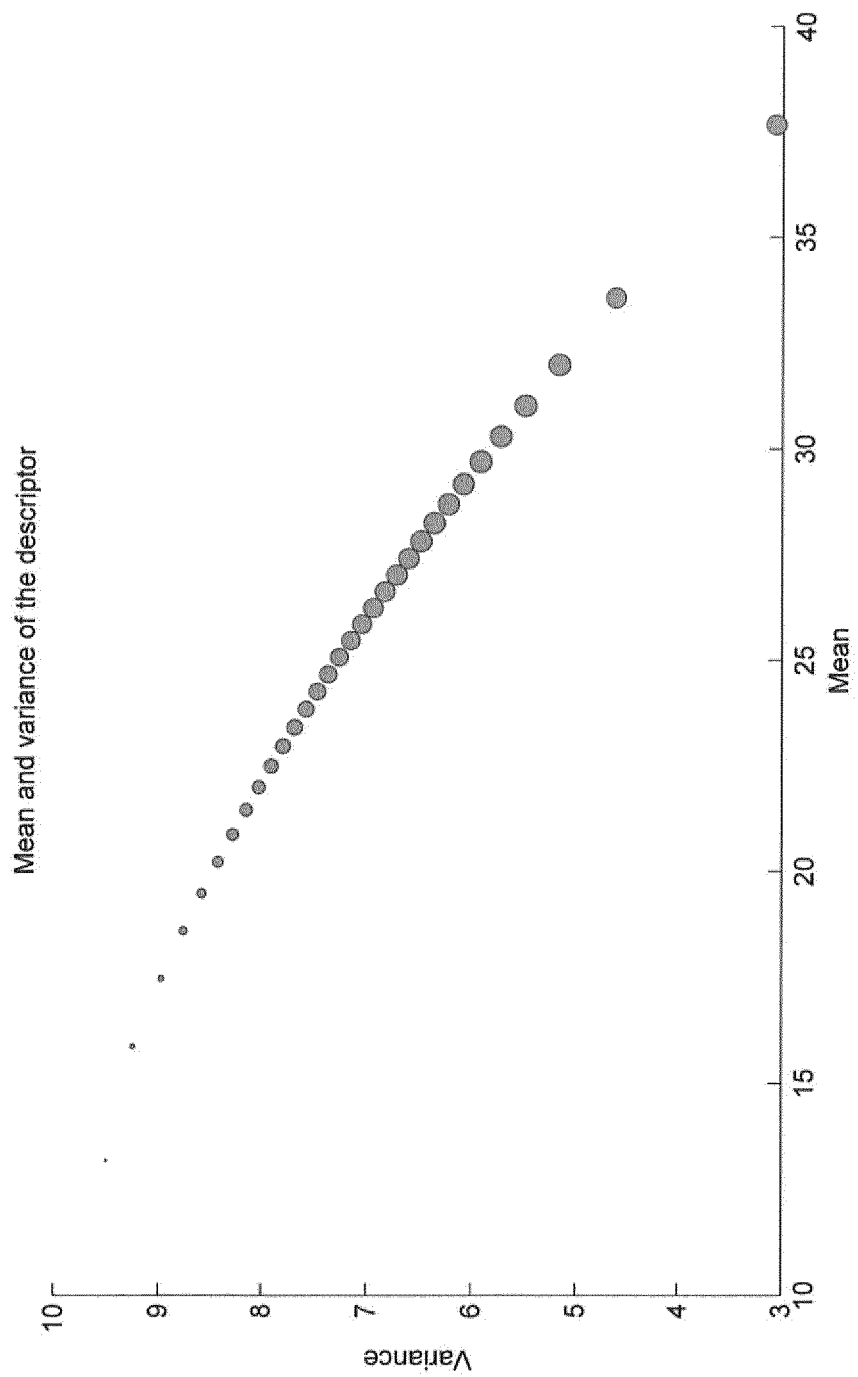

FIG. 2E is a first statistical distribution Rsd related to the descriptors D of the keypoints KP. In this case, the corresponding histogram is three-dimensional, with each bin thereof corresponding to interval values of two parameters of the descriptor D of the generic keypoint KP, i.e., the mean (x axis) and the variance (y axis) of the descriptor D. Greater frequency values are indicated by circles of larger diameter. The mean and the variance have been considered together to form a same histogram, since they are linked to each other. According to such histogram, the bin having the highest keypoints KP frequency, represented by larger circles, is the one corresponding to the highest mean and the lowest variance. This can be explained by the fact that the higher the mean of the descriptor D of a keypoint KP, the higher the luminance gradient corresponding to such keypoint KP, and the lower the variance of the descriptor D of a keypoint KP, the lower the unwanted noise affecting such keypoint KP.

Figure 2F:
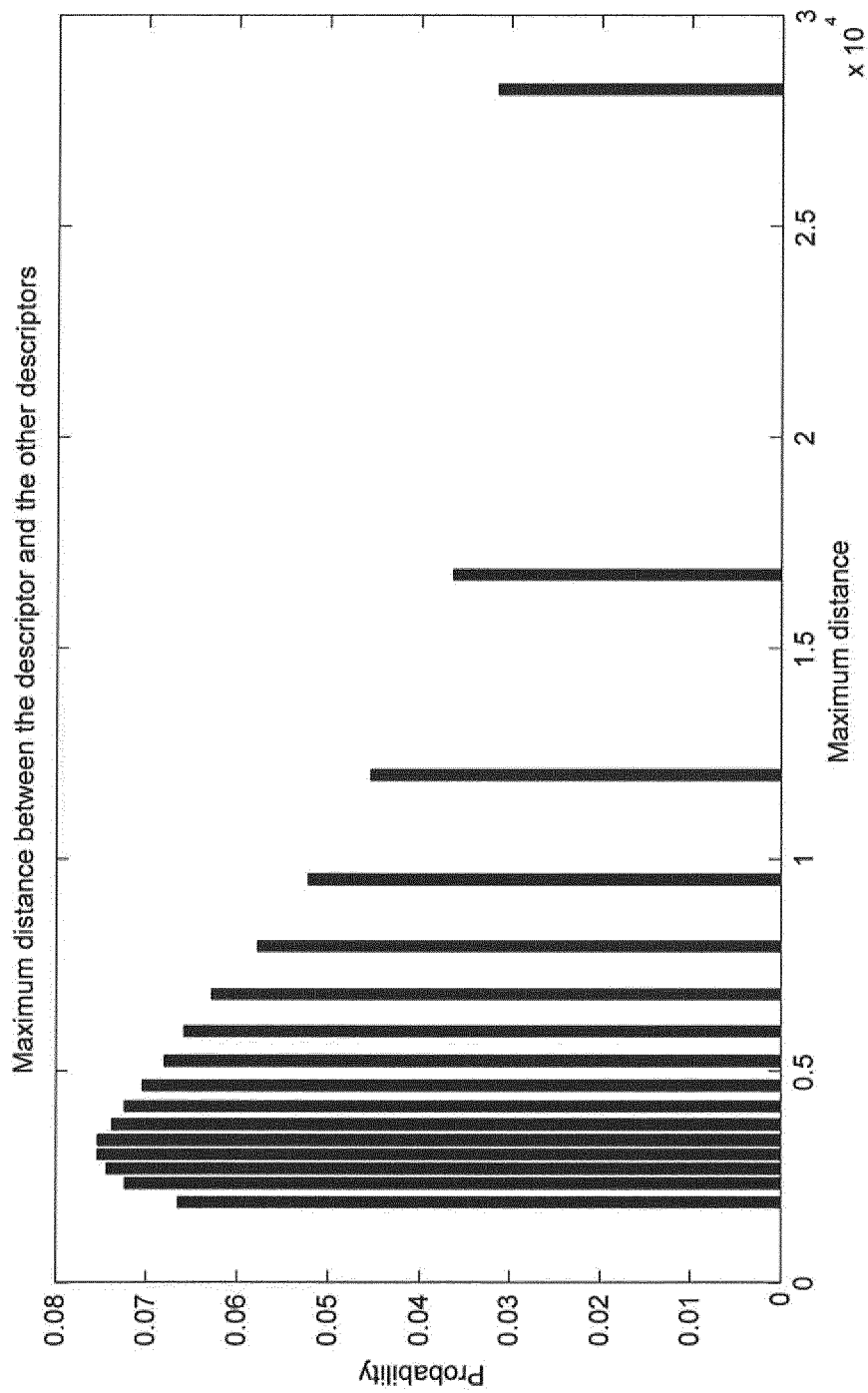

FIG. 2F is a second statistical distribution Rsd related to the descriptors D of the keypoints KP. In this case, each bin corresponds to a particular maximum distance between the descriptor D of a keypoint KP and the descriptors D of the other keypoints KP of the same image. For example, such maximum distance may be computed based on the Euclidean distance between descriptors, Other known method may be also contemplated, such as for example exploiting the symmetrized Kullback-Leibler divergence.

Returning to FIG. 1, according to an embodiment of the present invention, phase 130 of the extraction procedure 100 provides for calculating, for each keypoint KP extracted at phase 110:

A first feature relevance probability FRP1, obtained from the statistical distribution Rsd related to the coordinates C of said keypoint KP. The histogram corresponding to said distribution is inspected in order to identify the bin thereof fitting the coordinates C of said keypoint KP; then, the feature relevance probability FRP1 is set equal to the keypoints frequency of the identified bin.

A second feature relevance probability FRP2, obtained from the statistical distribution Rsd related to the dominant orientation O of said keypoint KP. The histogram corresponding to said distribution is inspected in order to identify the bin thereof fitting the dominant orientation O of said keypoint KP; then, the feature relevance probability FRP2 is set equal to the keypoints frequency of the identified bin.

A third feature relevance probability FRP3, obtained from the statistical distribution Rsd related to the peak P of said keypoint KP. The histogram corresponding to said distribution is inspected in order to identify the bin thereof fitting the peak P of said keypoint KP; then, the feature relevance probability FRP3 is set equal to the keypoints frequency of the identified bin.

A fourth feature relevance probability FRP4, obtained from the statistical distribution Rsd related to the scale S of said keypoint KP. The histogram corresponding to said distribution is inspected in order to identify the bin thereof fitting the scale S of said keypoint KP; then, the feature relevance probability FRP4 is set equal to the keypoints frequency of the identified bin.

A fifth feature relevance probability FRP5, obtained from the statistical distribution Rsd related to the mean and the variance of the descriptor D of said keypoint KP. The histogram corresponding to said distribution is inspected in order to identify the bin thereof fitting the mean and the variance of the elements of the descriptor D of said keypoint KP; then, the feature relevance probability FRP5 is set equal to the keypoints frequency of the identified bin.

A sixth feature relevance probability FRP6, obtained from the statistical distribution Rsd related to the maximum distance (e.g., the Euclidean distance) between the descriptor D of said keypoint KP and the descriptors D of the other keypoints KP. The histogram corresponding to said distribution is inspected in order to identify the bin thereof fitting such distance; then, the feature relevance probability FRP6 is set equal to the keypoints frequency of the identified bin.

Therefore, for each keypoint KP, a keypoint relevance probability KRP is obtained by at least one of, or by combining among them the feature relevance probabilities FRP of the local features thereof. For example, starting with the assumption that the feature relevance probabilities FRP are independent to one another, the keypoint relevance probability KRP of the generic keypoint KP is calculated by multiplying to each other its corresponding feature relevance probabilities FRP. Generally, the higher the number of different feature relevance probabilities FRP used to calculate the keypoint relevance probability KRP, the better the results obtainable by employing such method. By considering the example of SIFT descriptors for visual searching applications, it is preferable that the feature relevance probabilities considered for calculating the keypoint relevance probability include at least those corresponding to the scale, the peak and the distance from the centre.

Figure 2G:
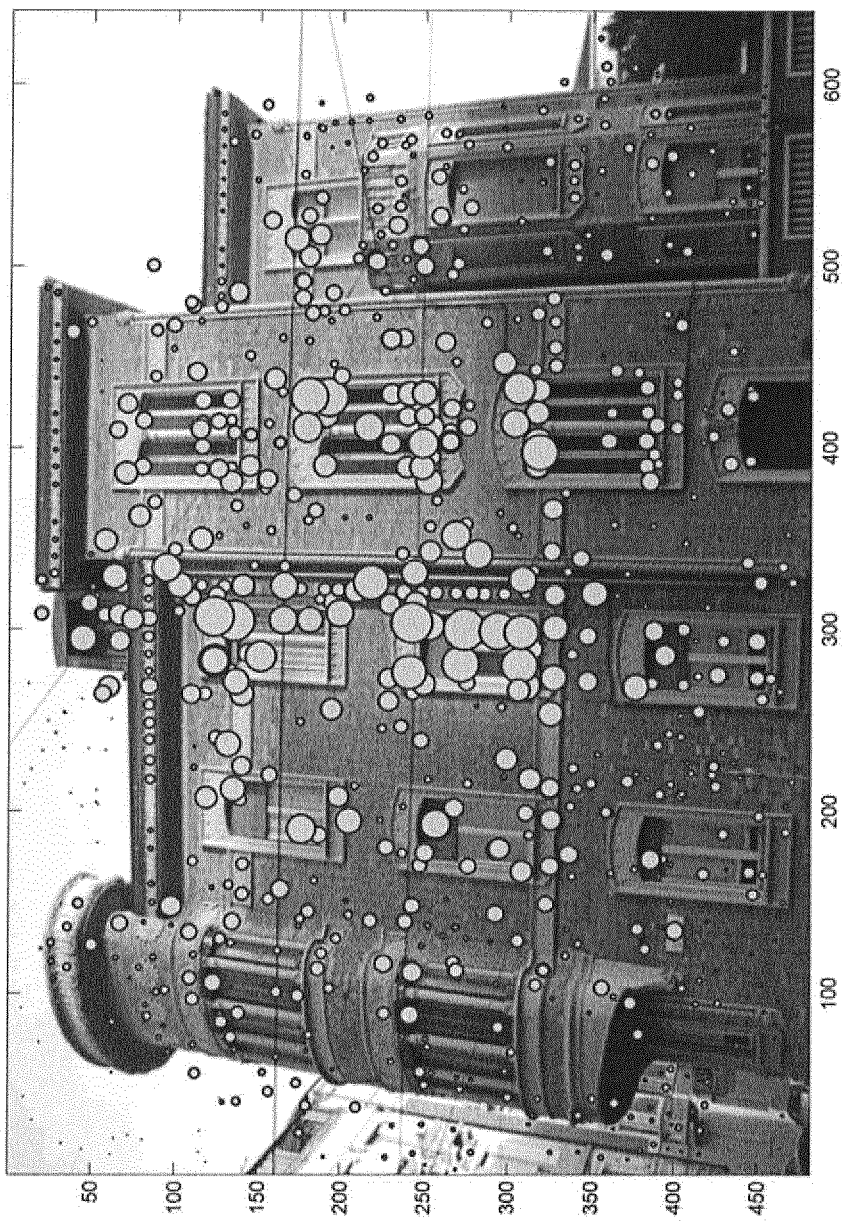
FIG. 2G is an exemplary picture processed according to the extraction procedure of FIG. 1.

FIG. 2G is an exemplary picture in which a plurality of keypoints are identified by means of corresponding circular spots, each one having a diameter that is proportional to the relevance probability KRP of the keypoint.

Once the keypoint relevance probabilities KRP of all the keypoints KP extracted in phase 110 have been calculated, said keypoints KP are sorted in a sequence according to a decreasing keypoint relevance probability KRP order. Then, the optimal subset SUB is formed by taking a number (based on the desired reduction in the amount of data to be managed) of keypoints KP from the first ones of the ordered sequence. The selected keypoints KP belonging to the optimal subset SUB results to be the most relevant keypoints KP (from the image comparison point of view) among the totality of keypoints KP extracted in phase 110. In this way, the reduction of the overall amount of data is carried out in a smart and efficient way, taking into account only the relevant keypoints KP, and discarding those that are less useful.

It is underlined that although the selection of the optimal subset of keypoints according to the embodiment of the invention above described provides for calculating each feature relevancy probability exploiting a corresponding statistical distribution Rsd obtained by calculating for each bin thereof a ratio between the keypoint inliers having a value of the corresponding local feature that falls within said bin, and the total number of keypoints having a value of the corresponding local feature that falls within the same bin, the concepts of the present invention are also applicable in case different, statistically equivalent statistical distributions are employed, obtained with different, even manual, methods. In the following description, two statistical distributions are considered statistically equivalent one to another if they allow to obtain similar feature relevancy probabilities starting from a same set of keypoints.

Compression of the Descriptors (Phase 140)

According to an embodiment of the present invention, the compression of the descriptors D is carried out through vector quantization, by exploiting a reduced number of optimized codebooks.

FIG. 3A illustrates an exemplary descriptor D of the SIFT type (one of the descriptors D generated at phase 120 of the extraction procedure 100 of FIG. 1 which has been selected to be part of the optimal subset SUB) corresponding to a generic keypoint KP. As already mentioned above, the descriptor D comprises sixteen sub-histograms shi (i=1, 2, . . . , 16), each one showing how the luminance gradient of a respective sub-region of the image close to the keypoint KP is distributed along eight directions. Specifically, each sub-histogram shi is associated with a sub-region corresponding to one of 16 cells of a 4×4 grid that is centered at the keypoint KP location and oriented according to the dominant orientation O of the keypoint KP; each sub-histogram shi includes eight bins, each one corresponding to an orientation having an angle $n*\pi/4$ (n=0, 1, . . . 7) with respect to the dominant orientation O.

As illustrated in FIG. 3B, the values of all the orientation histograms shi of a descriptor D are arranged in a corresponding descriptor array, identified in figure with the reference DA. The descriptor array DA comprises sixteen elements ai (i=1,2, . . . , 16), each one storing the values taken by a corresponding sub-histogram shi (i=1,2, . . . , 16); each element ai comprises in turn eight respective sub-elements, each one storing a frequency value corresponding to a respective one of the eight bins of the sub-histogram shi. Thus, each descriptor array DA includes 16*8=128 sub-elements. By considering that in a SIFT descriptor D a typical frequency value may range from 0 to 255, each sub-element of the descriptor array DA can be represented with a byte; therefore, the memory occupation of the descriptor array DA is equal to 128 bytes. Thus, making reference again to the extraction procedure 100 of FIG. 1, the amount of data (in bytes) corresponding to all the descriptors D of the keypoints KP belonging to the selected optimal subset SUB is equal to 128 multiplied by the number of keypoints KP of the optimal subset SUB.

In order to reduce this amount of data, the descriptor arrays DA corresponding to such descriptors D are compressed through vector quantization.

As it is well known to those skilled in the art, compressing a data array formed by n elements (n-tuple) by exploiting vector quantization provides for jointly quantizing the set of all the possible n-tuple values which the data array may assume into a reduced set comprising a lower number of n-tuple values (which values may even differ from the values of the set to be quantized). Since the reduced set comprises a lower number of n-tuple values, it requires less storage space.

The n-tuple values forming the reduced set are also referred to as "codewords". Each codeword is associated with a corresponding set of different n-tuple values the array may assume. The association relationships between n-tuple values of the data array and codewords is determined by means of a corresponding codebook.

Making reference in particular to the descriptor array DA, which includes 16 elements ai formed in turn by eight sub-elements each having values ranging from 0 to 255, the descriptor array DA may take a number $N=256^{128}$ of different 16-tuple values. By applying compression through vector quantization, such N different 16-tuple values are approximated with a number $N1<N$ of codewords of a codebook. The codebook determines association relationships between each codeword and a corresponding set of 16-tuple values of the descriptor array DA. Therefore, each codeword of the codebook is a 16-tuple value which is used to "approximate" a corresponding set of 16-tuple values of the descriptor array DA. The vector quantization is a lossy data compression, whose accuracy can be measured through a parameter called distortion. The distortion may be for example calculated as the Euclidean distance between a generic codeword of the codebook and the set of n-tuple values of the array which are approximated by such codeword. Similar considerations apply even if the distortion is calculated with a different method. In any case, broadly speaking, the higher the number N1 of codewords of a codebook, the lower the distortion of the compression.

As it is well known to those skilled in the art, the generation of the codewords of a codebook is typically carried out by performing statistical operations (referred to as training operations) on a training database including a collection of a very high number of training arrays. Making reference in particular to the descriptor array DA, the training database may include several millions of training descriptor arrays, wherein each training descriptor array is one of the $N=256^{128}$ possible 16-tuple values the descriptor array DA may assume.

According to a solution illustrated in FIG. 4A, the whole descriptor array DA is compressed using a single codebook CBK comprising N1 16-tuple value codewords CWj (j=1, 2, . . . N1). Therefore, with N1 different codewords CWj, the minimum number of bits required to identify the codewords is equal to $\log_2 N1$. As already mentioned above, the generation of the N1 different codewords CWj of such single codebook CBK is carried out by performing training operations on a plurality of training descriptor arrays, wherein each training descriptor array is one of the $N=256^{128}$ possible 16-tuple values the descriptor array DA may assume.

In order to keep the compression distortion under a sufficiently reduced threshold such as not to impair the outcome of the subsequent image analysis operations, the required codewords number N1 may become very high. Having a codebook formed by too high a number N1 of codewords is disadvantageous under different points of view. Indeed, the number of training arrays to be used for generating the codewords would become excessive, and the processing times would become too long. Moreover, in order to carry out compression operations by exploiting a codebook, the whole N1 codewords forming the latter have to be memorized somewhere, occupying a non-negligible amount of memory space. The latter drawback is quite critical, since the hardware employed for image analysis applications (e.g., Graphic Processing Units, GPU) may be equipped with not so capacious memories.

Figure 4B:
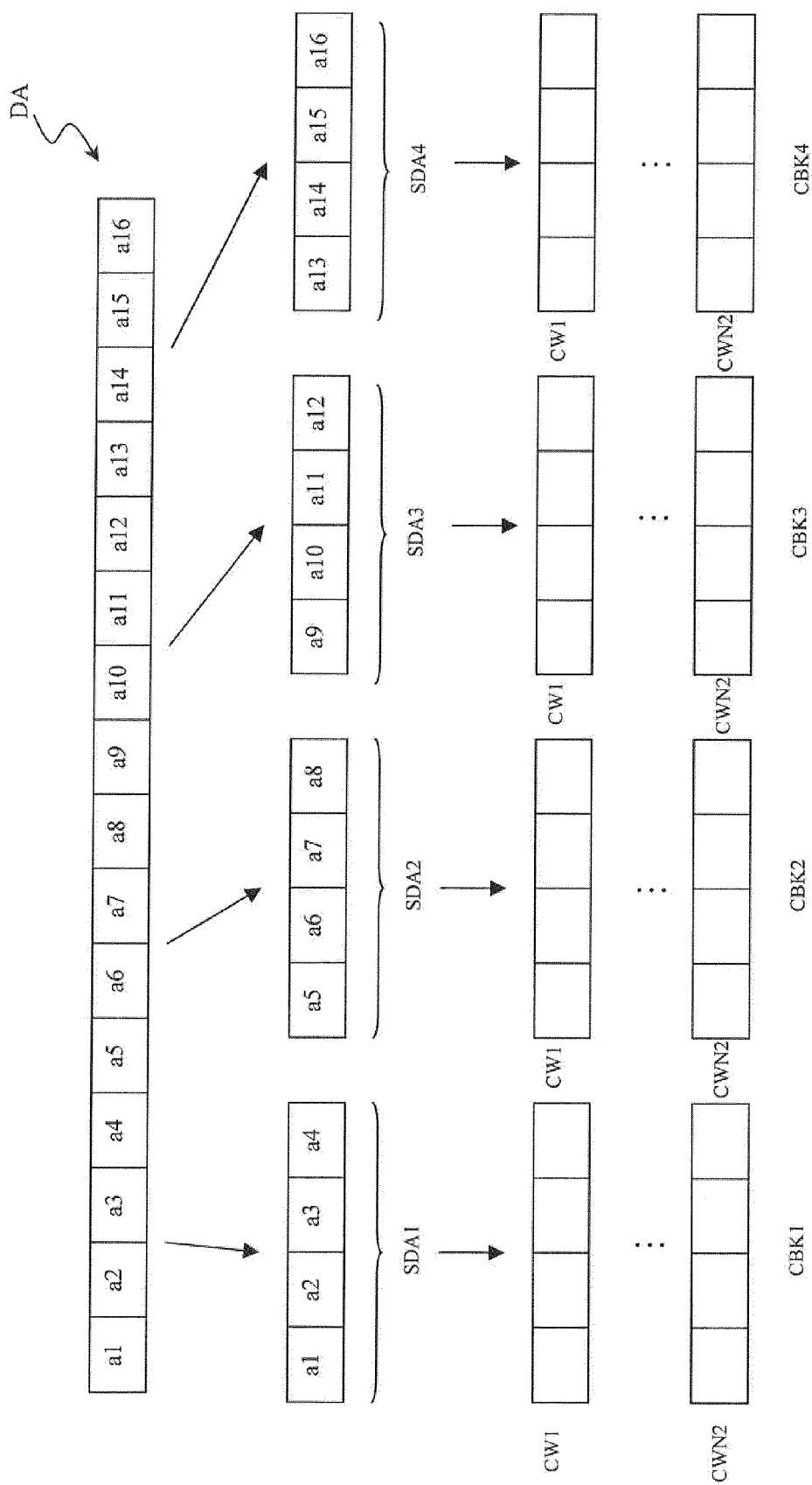
FIG. 4B illustrates an exemplary descriptor array compression according to another solution known in the art.

Making reference to FIG. 4B, in order to reduce the whole number of codewords CWj to be managed without increasing the distorsion, the descriptor array DA may be subdivided into a plurality of sub-arrays SDAk (k=1, 2, . . . ), each one comprising a respective number mk of elements ai of the descriptor array DA, and then each sub-array SDAk is individually compressed using a respective codebook CBKk comprising N2 mk-tuple value codewords CWj (j=1, 2, . . . N2).

In the example illustrated in FIG. 4B, the descriptor array DA is subdivided into four sub-arrays SDAk (k=1, 2, 3, 4), each one comprising mk=4 elements ai of the descriptor array DA:

the first sub-array SDA1 is formed by the element sequence a1, a2, a3, a4;
the second sub-array SDA2 is formed by the element sequence a5, a6, a7, a8;
the third sub-array SDA3 is formed by the element sequence a9, a10, a11, a12, and
the fourth sub-array SDA4 is formed by the element sequence a13, a14, a15, a16.

The compression of each sub-array SDAk is carried out using a respective codebook CBKy (y=k) comprising N2 4-tuple value codewords CWj (j=1, 2, . . . N2). Therefore, with 4*N2 different codewords CWj, the minimum number of bits required to identify all the codewords is equal to $4*\log_2 N2$. Even if in the considered case each sub-array SDAk has been compressed using a codebook CBKy comprising a same number N2 of codewords CWj, similar considerations apply in case each sub-array SDAk is compressed using a respective, different, number of codewords CWj.

In the case illustrated in FIG. 4B, the generation of the N2 different codewords CWj of each codebook CBKy is carried out by performing training operations on a respective sub-set of training descriptor arrays. Each sub-set of training descriptor arrays of a codebook CBKk corresponds to one of the four sub-arrays SDAk, and may be obtained by considering from each training descriptor array used to generate the single codebook CBK of FIG. 4A only the portion thereof corresponding to the sub-array SDAk. For example, in order to generate the codebook CBK1, only the first four elements a1, a2, a3, a4 of the 16-tuple training descriptor arrays used to generate the single codebook CBK of FIG. 4A are employed.

Compared to the case of FIG. 4A, in which the whole descriptor array DA is compressed using a single codebook CBK formed by codewords CWj having the same dimension of the descriptor array DA itself (16 elements), the use of codebooks CBKy formed by codewords CWj having a (smaller) dimension mk of a sub-array SDAk thereof (e.g., mk=4 elements) allows to obtain, with a same number of codewords CWj, a lower distortion.

Having fixed the total number of codewords CWj, the higher the number of sub-arrays SDAk which the descriptor array DA is subdivided in, the lower the distortion, but—at the same time—the higher the minimum number of bits required to identify all the codewords CWj.

According to an embodiment of the present invention, the subdivision of the descriptor array DA in sub-arrays SDAk for compression purposes is carried out by taking into consideration the occurrence of correlation relationships among the elements ai of the descriptor array DA.

As already described with reference to FIGS. 3A and 3B, each element ai of the descriptor array DA stores the values taken by the sub-histogram shi associated with a respective sub-region, which sub-region corresponds in turn to a cell of the 4×4 grid centered at the keypoint KP corresponding to such descriptor array DA.

Figure 5:
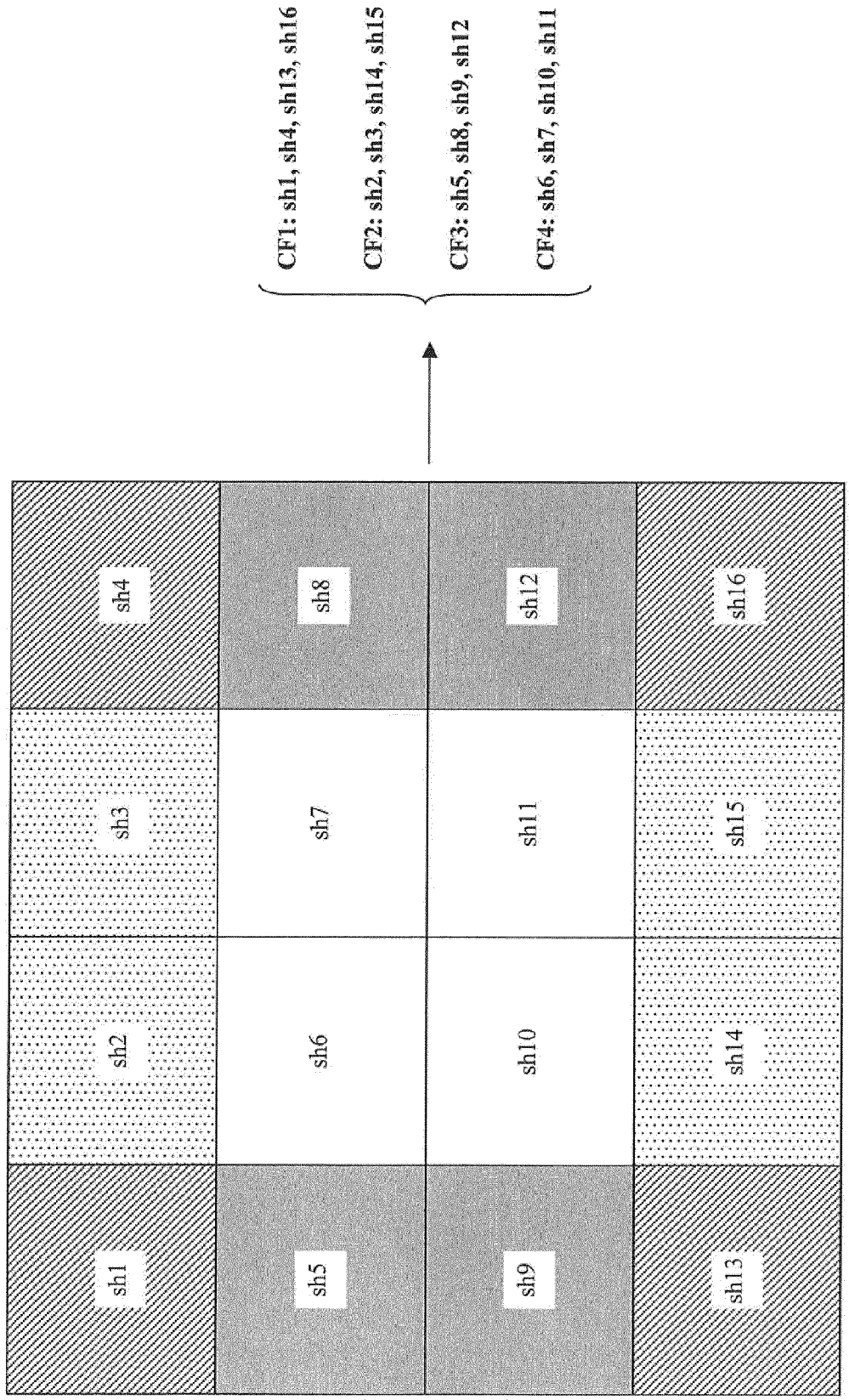
FIG. 5 illustrates an arrangement of sub-histograms of a descriptor in correlation families according to an embodiment of the present invention.

According to an embodiment of the present invention illustrated in FIG. 5, after having carried out statistical behavioral analysis on a large amount of descriptor arrays DA (for example exploiting the training descriptor arrays of the training database), it has been found that the sub-histograms shi of a generic keypoint KP can be arranged in correlation families CFx (x=1, 2, 3, 4), with each correlation family CFx comprising a set of correlated sub-histograms shi with a similar statistical behavior, i.e., with a similar trend of the bin frequencies. For example, two sub-histograms shi belonging to a same correlation family CFx may have a similar number of frequency peaks at same (or similar) bins.

The statistical behavioral analysis employed to form the correlation families CFx showed that, having fixed the maximum number of codewords CWj to be used for compressing the descriptor array DA, if the arrangement of the sub-histograms shi in correlation families CFx is varied (by assigning the sub-histograms shi to different correlation families CFx), the resulting distortion accordingly varies. The correlation families CFx are thus formed by considering, among all the possible sub-histograms shi subdivisions, the one corresponding to the lowest distortion.

After having performed such statistical behavioral analysis it has also been found that the correlation between the statistical behavior of two sub-histograms shi depends on two main parameters, i.e., the distance of the sub-regions associated to the sub-histograms shi from the keypoint KP and the dominant orientation thereof.

Making reference to FIG. 5, the sixteen sub-histograms shi of a keypoint KP are arranged in four correlation families, i.e.:

a first correlation family CF1 comprising the sub-histograms sh1, sh4, sh13 and sh16;
a second correlation family CF2 comprising the sub-histograms sh2, sh3, sh14 and sh15;
a third correlation family CF3 comprising the sub-histograms sh5, sh8, sh9 and sh12, and
a fourth correlation family CF4 comprising the sub-histograms sh6, sh7, sh10 and sh11.

According to an embodiment of the present invention, the above identified correlation families CFx are advantageously exploited in order to compress the descriptor array DA using a reduced number of optimized codebooks CBKy. The subdivision of the descriptor array DA in sub-arrays SDAk is carried out in such a way that at least two sub-arrays SDAk have the same global (i.e., considering all the elements thereof) statistical behavior; in this way, it is possible to use a single codebook CBKy to compress more than one sub-arrays SDAk. For this purpose, the subdivision of the descriptor array DA is carried out in such a way to obtain group(s) of sub-arrays SDAk in which for each group the elements ai occupying the same position in all the sub-arrays SDAk of the group belong to a same correlation family CFx. Therefore, all the sub-arrays SDAk belonging to a same group can be advantageously compressed using a same corresponding codebook CBKy, whose codewords CWj are obtained by considering, from each training descriptor array used to generate the single codebook CBK of FIG. 4A, only the elements thereof belonging to the correlation families CFx which the elements ai of the sub-arrays SDAk of the group belong to.

Figure 6A:
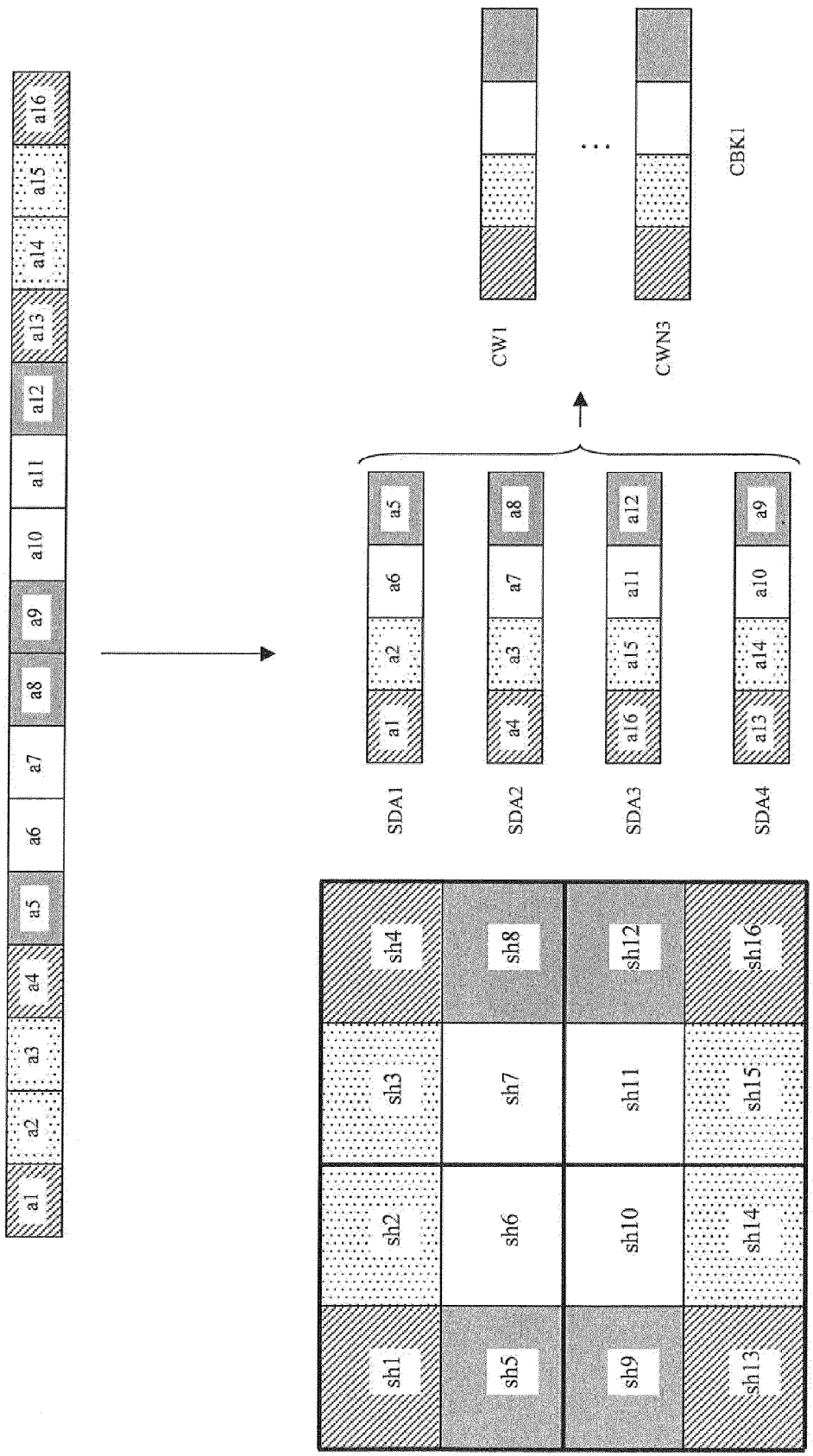
FIGS. 6A-6D show how the descriptor array is compressed according to exemplary embodiments of the present invention.

According to an exemplary embodiment of the present invention illustrated in FIG. 6A, the descriptor array DA is subdivided in four sub-arrays SDA1-SDA4 which are arranged in a single group. Therefore, all the sub-arrays SDAk are compressed using a same codebook CBK1. Specifically:

the first sub-array SDA1 is formed by the element sequence a1, a2, a6, a5;
the second sub-array SDA2 is formed by the element sequence a4, a3, a7, a8;
the third sub-array SDA3 is formed by the element sequence a16, a15, a11, a12, and the fourth sub-array SDA4 is formed by the element sequence a13, a14, a10, a9.

In this case:

the first elements ai of each sub-array SDAk belong to the first correlation family CF1;

the second elements ai of each sub-array SDAk belong to the second correlation family CF2;

the third elements ai of each sub-array SDAk belong to the fourth correlation family CF4, and the fourth elements ai of each sub-array SDAk belong to the third correlation family CF3.

The codebook CBK1 for compressing the generic sub-array SDA1-SDA4 includes N3 codewords CWj, wherein each codeword CWj has the first element belonging to the first correlation family CF1, the second element belonging to the second correlation family CF2, the third element belonging to the fourth correlation family CF4, and the fourth element belonging to the third correlation family CF3.

With N3 different codewords CWj, the minimum number of bits required to identify all the codewords is equal to $4*(\log_2 N3)$.

Figure 6B:
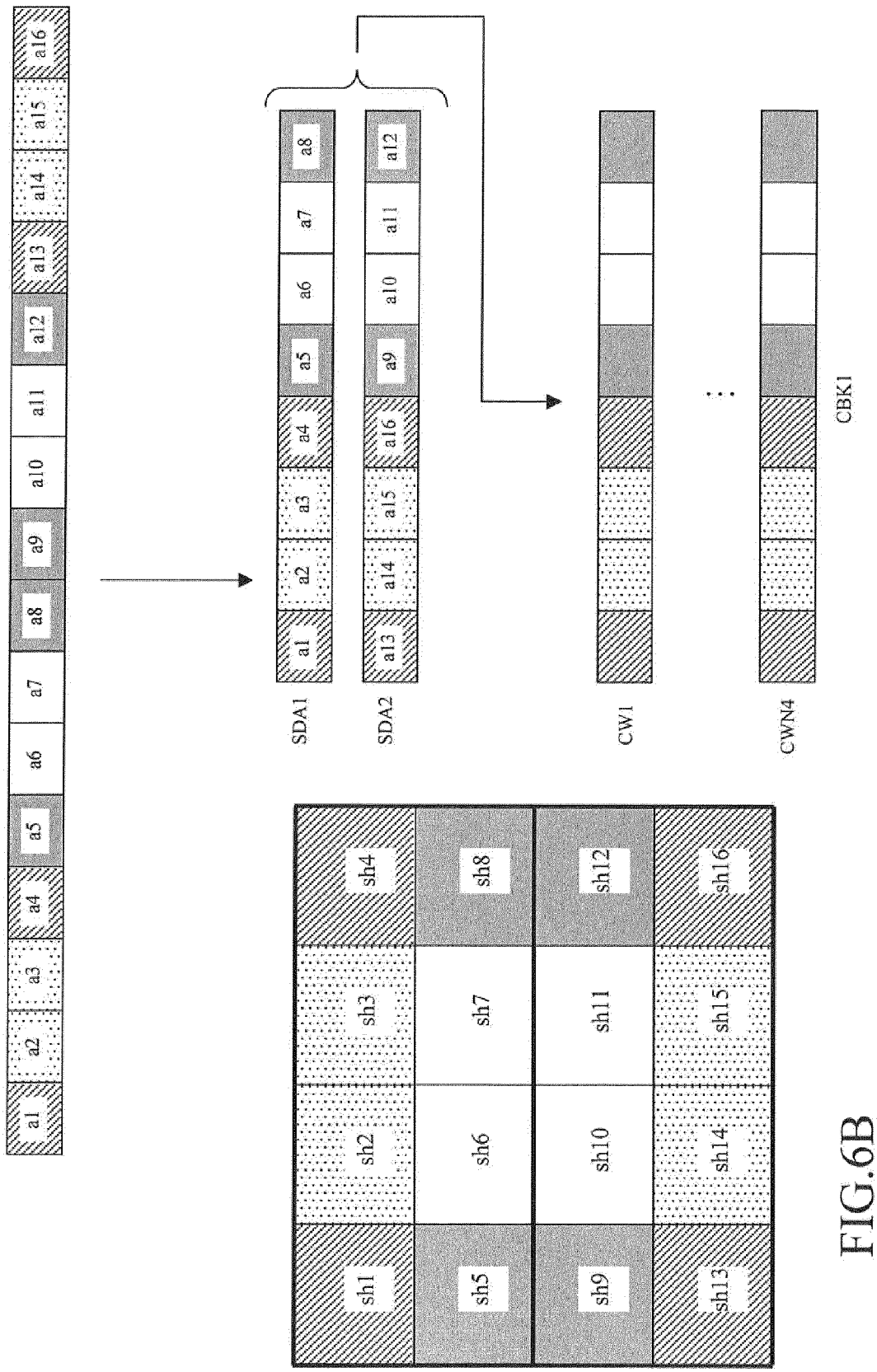

According to another exemplary embodiment of the present invention illustrated in FIG. 6B, the descriptor array DA is subdivided in two sub-arrays SDA1, SDA2 which are arranged in a single group. Therefore, all the sub-array SDAk are compressed using a same codebook CBK1. Specifically:

the first sub-array SDA1 is formed by the element sequence a1, a2, a3, a4, a5, a6, a7, a8, and the second sub-array SDA2 is formed by the element sequence a13, a14, a15, a16, a9, a10, a11, a12.

In this case:

the first and the fourth elements ai of each sub-array SDAk belong to the first correlation family CF1;

the second and the third elements ai of each sub-array SDAk belong to the second correlation family CF2;

the fifth and the eighth elements ai of each sub-array SDAk belong to the third correlation family CF3, and the sixth and the seventh elements ai of each sub-array SDAk belong to the fourth correlation family CF4.

The codebook CBK1 for compressing the generic sub-array SDA1, SDA2 includes N4 codewords CWj, wherein each codeword CWj has the first and the fourth elements belonging to the first correlation family CF1, the second and the third elements belonging to the second correlation family CF2, the fifth and the eighth elements belonging to the third correlation family CF3, and the sixth and the seventh elements belonging to the third correlation family CF3.

With N4 different codewords CWj, the minimum number of bits required to identify all the codewords is equal to $2*(\log_2 N4)$.

Figure 6C:
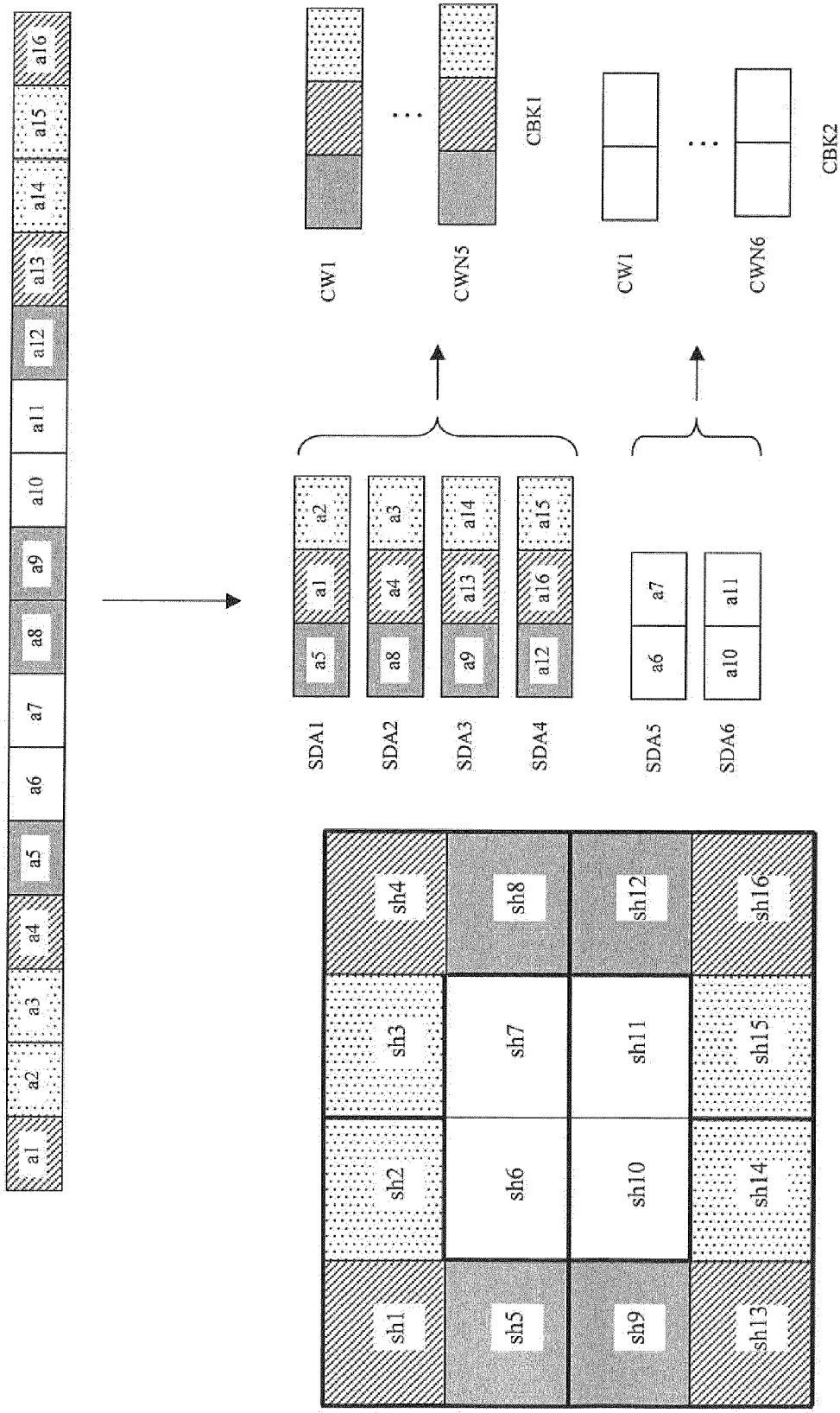

According to another exemplary embodiment of the present invention illustrated in FIG. 6C, the descriptor array DA is subdivided in six sub-arrays SDA1-SDA6, four of which (SDA1-SDA4) are arranged in a first group, and two of which (SDA5, SDA6) are arranged in a second group. Therefore, the sub-arrays SDA1-SDA4 are compressed using a same first codebook CBK1, while the sub-arrays SDA5-SDA6 are compressed using a same second codebook CBK2. Specifically:

the first sub-array SDA1 is formed by the element sequence a5, a1, a2;

the second sub-array SDA2 is formed by the element sequence a8, a4, a3;

the third sub-array SDA3 is formed by the element sequence a9, a13, a14;

the fourth sub-array SDA4 is formed by the element sequence a12, a16, a15;

the fifth sub-array SDA5 is formed by the element sequence a6, a7, and the sixth sub-array SDA6 is formed by the element sequence a10, a11.

In this case:

the first elements ai of each sub-array SDA1-SDA4 of the first group belong to the third correlation family CF3;

the second elements ai of each sub-array SDA1-SDA4 of the first group belong to the first correlation family CF1;

the third elements ai of each sub-array SDA1-SDA4 of the first group belong to the second correlation family CF2, and the first and second elements ai of each sub-array SDA5-SDA6 of the second group belong to the fourth correlation family CF4.

The codebook CBK1 for compressing the generic sub-array SDA1-SDA4 belonging to the first group includes N5 codewords CWj, wherein each codeword CWj has the first element belonging to the third correlation family CF3, the second element belonging to the first correlation family CF1, and the third element belonging to the second correlation family CF2. The codebook CBK2 for compressing the generic sub-array SDA5-SDA6 belonging to the second group includes N6 codewords CWj, wherein each codeword CWj has the first and second elements belonging to the fourth correlation family CF4.

With N5+N6 different codewords CWj, the minimum number of bits required to identify all the codewords is equal to $4*(\log_2 N5)+2*(\log_2 N6)$.

Figure 6D:
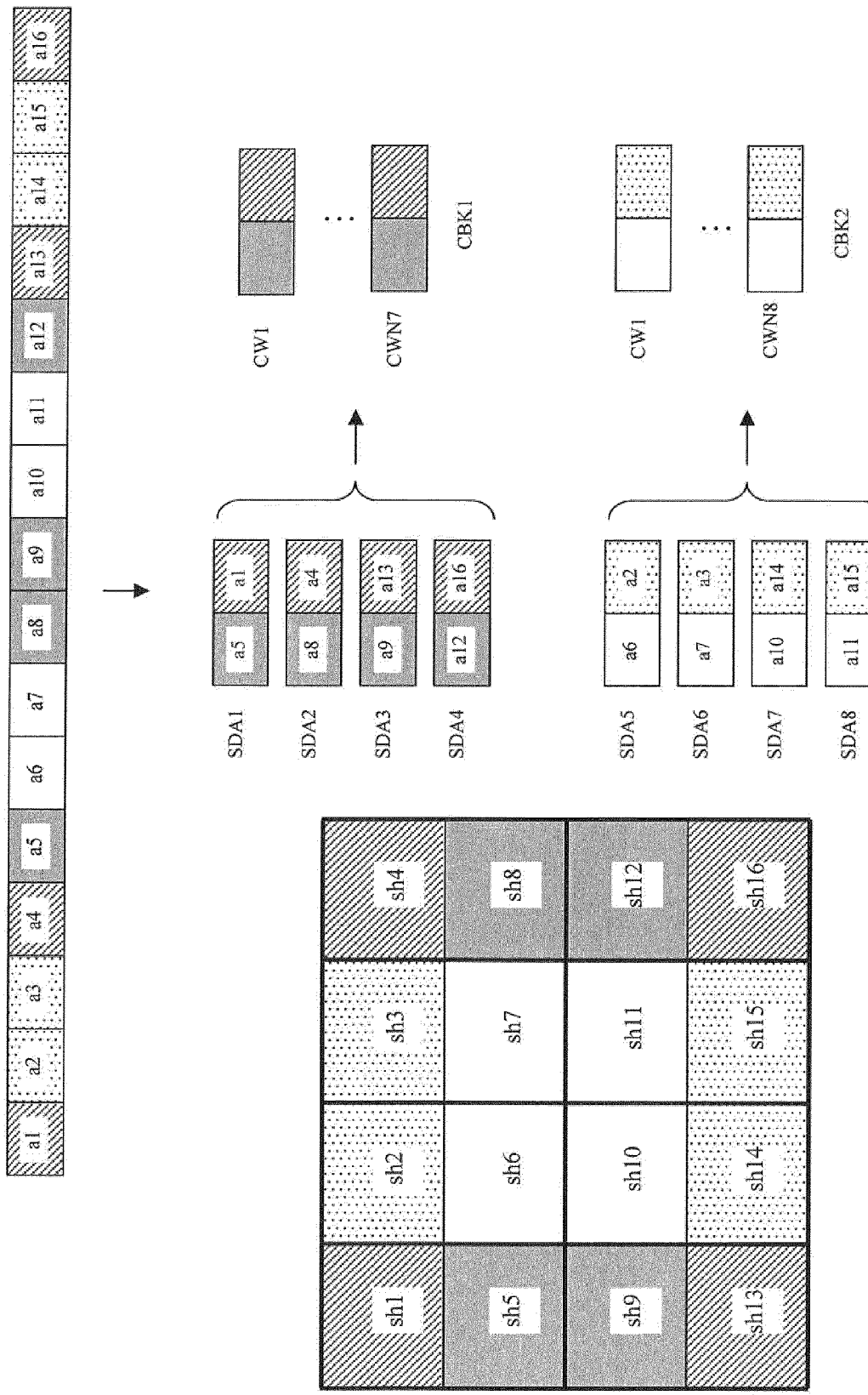

According to another exemplary embodiment of the present invention illustrated in FIG. 6D, the descriptor array DA is subdivided in eight sub-arrays SDA1-SDA8, four of which (SDA1-SDA4) are arranged in a first group, and four of which (SDA5-SDA8) are arranged in a second group. Therefore, the sub-arrays SDA1-SDA4 are compressed using a same first codebook CBK1, while the sub-arrays SDA5-SDA8 are compressed using a same second codebook CBK2. Specifically:

the first sub-array SDA1 is formed by the element sequence a5, a1;

the second sub-array SDA2 is formed by the element sequence a8, a4;

the third sub-array SDA3 is formed by the element sequence a9, a13;

the fourth sub-array SDA4 is formed by the element sequence a12, a16;

the fifth sub-array SDA5 is formed by the element sequence a6, a2;

the sixth sub-array SDA6 is formed by the element sequence a7, a3;

the seventh sub-array SDA7 is formed by the element sequence a10, a14, and the eighth sub-array SDA8 is formed by the element sequence a11, a15.

In this case:

the first elements ai of each sub-array SDA1-SDA4 of the first group belong to the third correlation family CF3;

the second elements ai of each sub-array SDA1-SDA4 of the first group belong to the first correlation family CF1;

the first elements ai of each sub-array SDA5-SDA8 of the second group belong to the fourth correlation family CF4, and the second elements ai of each sub-array SDA5-SDA8 of the second group belong to the second correlation family CF2.

The codebook CBK1 for compressing the generic sub-array SDA1-SDA4 belonging to the first group includes N7 codewords CWj, wherein each codeword CWj has the first element belonging to the third correlation family CF3, and the second element belonging to the first correlation family CF1. The codebook CBK2 for compressing the generic sub-array SDA5-SDA8 belonging to the second group includes N8 codewords CWj, wherein each codeword CWj has the first elements belonging to the fourth correlation family CF4 and the second elements belonging to the second correlation family CF2.

Therefore, with N7+N8 different codewords CWj, the minimum number of bits required to identify all the codewords is equal to $4*(\log_2 N7)+4*(\log_2 N8)$.

Naturally, the concepts of the present invention are also applicable with subdivisions into a different number of sub-arrays and/or with a different number of codebooks. Moreover, even if in the present description reference has been made to the compression of a SIF descriptor calculated on a grid including 4×4 cells with eight bins per histogram, similar consideration apply if the number of cells and/or the number of bins per histogram is different, as well as descriptors of other types are considered.

Compared to the known solutions, with a same compression distortion, the combined use of subdividing the descriptor array DA in sub-arrays SDAk and employing a same codebook CBKy for more than one sub-arrays SDAk allows to drastically reduce the memory space required to store the codebook(s) CBKy used to compress the descriptor array DA. This is a great advantage, since, as already mentioned above, the hardware employed for image analysis applications (e.g., Graphic Processing Units, GPU) may be equipped with not so capacious memories. Another advantage given by the combined use of subdividing the descriptor array DA in sub-arrays SDAk and employing a same codebook CBKy for more than one sub-arrays SDAk consists in that the training procedure for the generation of the codebook(s) CBKy results to be faster.

The compression operations carried out in phase 140 of the extraction procedure 100 (see FIG. 1) on each received descriptor D generate as a result a corresponding compressed descriptor array CDA, which approximate the value taken by the respective descriptor array DA. More specifically, for each codebook CBKy used to compress the descriptor array DA, each codeword CWj of such codebook CBKy is identified by a corresponding compression index Cy; if the codebook CBKy is formed by a number N of different codewords CWj, the compression index Cy is formed by at least $\log_2 N$ bits. For a descriptor array DA which has been subdivided into a set of sub-arrays SDAk, the corresponding compressed descriptor array CDA comprises a compression index Cy for each sub-array SDAk of the set, wherein each compression index Cy identifies the codeword CWj of the codebook CBKy used to approximate said sub-array SDAk.

Compression of the Coordinates (Phase 150)

According to an embodiment of the present invention, the amount of data to be managed (e.g., to be memorized and/or transmitted) for performing image analysis operations is further reduced by compressing the coordinates C of the keypoints KP belonging to the optimal subset SUB calculated at phase 130 of the extraction procedure 100 (see FIG. 1).

Figure 7B:
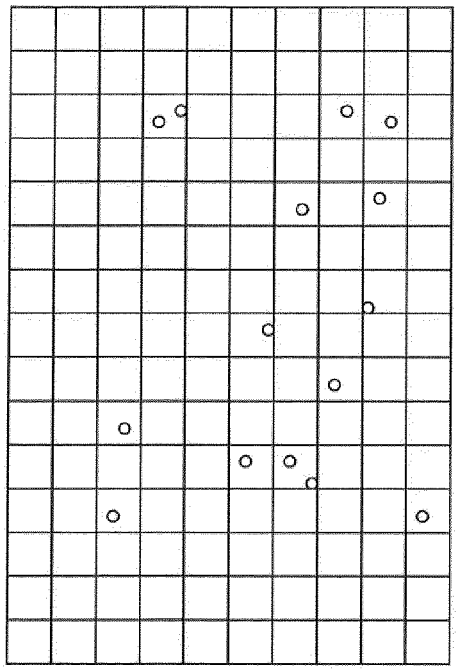
FIG. 7B illustrates how a grid can be superimposed over the query image for quantizing the coordinates of the keypoints of FIG. 7A.
Figure 7A:
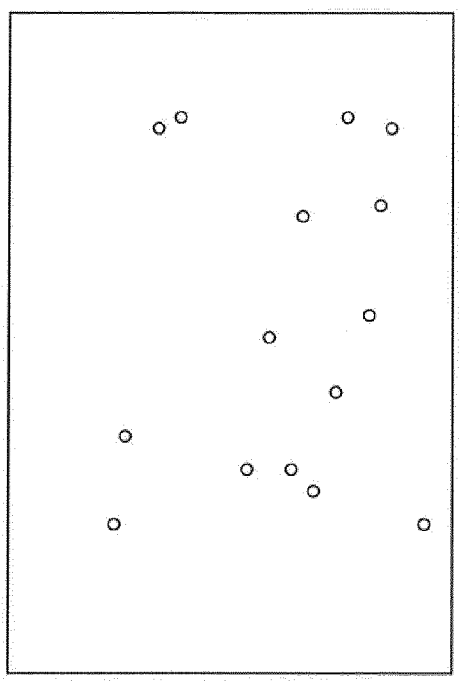
FIG. 7A illustrates an exemplary distribution of keypoints KP.

FIG. 7A illustrates an exemplary distribution of the keypoints KP of the optimal subset SUB within a bi-dimensional space corresponding to the query image 115; each keypoint KP is associated with a corresponding pair of spatial coordinates C identifying the location of such keypoint KP within the query image 115.

Firstly, the coordinates C of all the keypoints KP of the subset SUB are quantized. For this purpose, a n×m grid is superimposed over the query image 115. In the example illustrated in FIG. 7B, the grid has n=10 rows and m=15 columns.

Figure 7C:
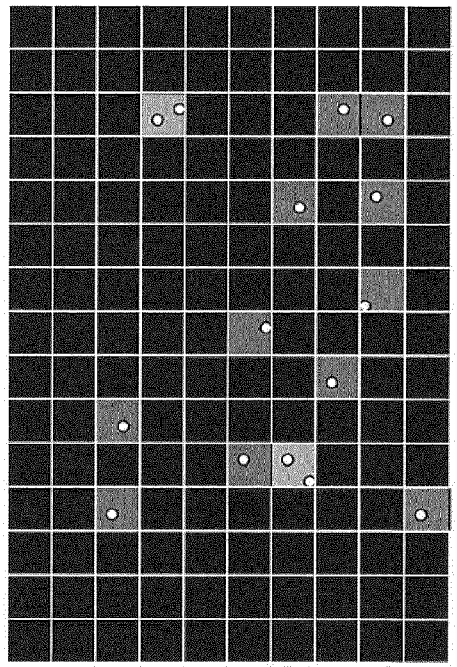
FIG. 7C is an exemplary graphical depiction of a histogram obtained by superimposing the grid of FIG. 7B over the set of keypoints KP of FIG. 7A.

A bi-dimensional histogram is then generated by counting for each cell of the grid (corresponding to a bin of the histogram) the number of keypoints KP which lie therewithin. FIG. 7C is an exemplary graphical depiction of the histogram obtained by superimposing the grid of FIG. 7B over the set of keypoints KP of FIG. 7A. In the graphical depiction of FIG. 7C, the cells void of keypoints KP are colored in black, while the cells including at least a keypoint KP are colored in gray. In the example at issue (wherein the cells including the highest number of keypoints include two keypoints), the cells including a single keypoint KP are colored in dark grey, while those including two keypoints KP are colored in a lighter grey.

The histogram obtained from the keypoint counting has a great number of bins whose frequency is equal to zero, i.e., with the corresponding cell that does not include any keypoint KP (the black cells depicted in FIG. 7C).

The data representing the histogram may be advantageously compressed taking into considerations that the portions thereof corresponding to the zero frequency bins only provide the information that its corresponding cell does not include any keypoint.

For this purpose, the rows and the columns of the grid which are entirely formed by cells that does not include any keypoints KP can be advantageously removed. However, since the removal of such rows and/or columns would alter the absolute and relative positions of the keypoints KP, an indication of the positions of all the rows and columns void of keypoints KP (comprising those corresponding to the rows and/or columns to be removed) should be recorded.

For this purpose, two arrays r and c are defined in the following way:

the array r is an array including an element for each row of the grid, wherein the generic element of the array is set to a first value (e.g., 0) if the corresponding cell of the grid does not include any keypoint KP, and it is set to a second value (e.g., 1) if the corresponding cell of the grid includes at least a keypoint KP, and the array c is an array including an element for each column of the grid, wherein the generic element of the array is set to a first value (e.g., 0) if the corresponding cell of the grid does not include any keypoint KP, and it is set to a second value (e.g., 1) if the corresponding cell of the grid includes at least a keypoint KP.

Once the arrays r and c have been generated, the next step provides for identify the rows and/or the columns which are entirely formed by cells that does not include any keypoints KP are identified. Making reference to the example at issue, such rows and columns are depicted in black in FIG. 7D.

Figure 7E:
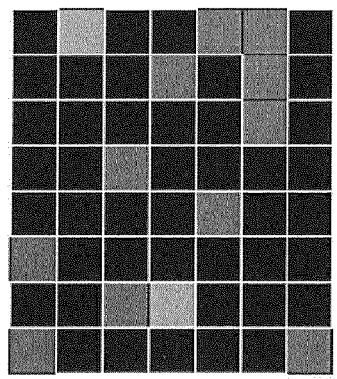
FIG. 7E illustrates an exemplary histogram over a rank-1 support.
Figure 7D:
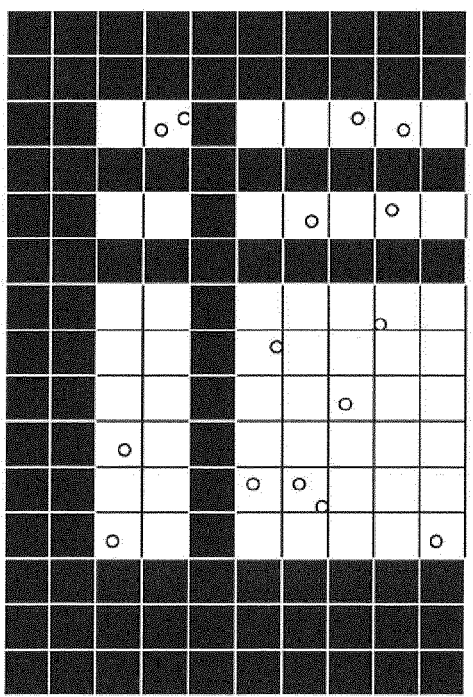
FIG. 7D identifies the columns and rows of the grid of FIG. 7B which are entirely formed by cells that do not include any keypoint.

The rows and/or the columns of the grid which are entirely formed by cells that do not include any keypoints KP are then removed, and the resulting portions of the grid are compacted in order to fill the empty spaces left by the removals. Thus, in the resulting (compacted) grid, referred to as rank-1 support, all the rows and all the columns include at least one cell comprising at least one keypoint KP. The histogram over the rank-1 support corresponding to the example at issue is illustrated in FIG. 7E.

From such histogram two different pieces of information can be extracted, i.e.:
1) the positions of the cells of the rank-1 support including at least one keypoint KP, and
2) for each cell of the rank-1 support identified at point 1), the number of keypoints KP included therein.

Advantageously, as proposed by S. Tsai, D. Chen, G. Takacs, V. Chandrasekhar, J. P. Singh, and B. Girod in "Location coding for mobile image retrieval", *Proc. Int. Mobile Multimedia Conference (MobiMedia)*, 2009, the information corresponding to point 1) may be extracted exploiting a so-called "histogram map", while the information corresponding to point 2) may be arranged in a so-called "histogram count".

Figure 7F:
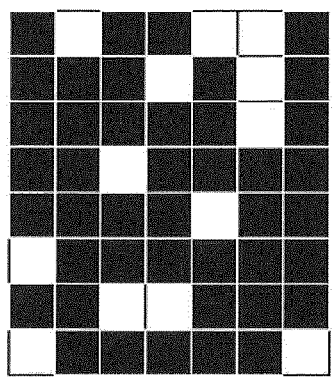
FIG. 7F illustrates a histogram map corresponding to the histogram over the rank-1 support of FIG. 7E.

The histogram map is a bi-dimensional mapping of the histogram over the rank-1 support which identifies the bins thereof having a frequency equal to or higher than 1. The histogram map corresponding to the histogram over the rank-1 support of FIG. 7E is illustrated in FIG. 7F.

The histogram map can be represented with a corresponding matrix, whose generic element is equal to zero if the corresponding cell of the rank-1 support does not include any keypoint KP, and is equal to one if the corresponding cell of the rank-1 support does include at least one keypoint KP. The matrix of the histogram map illustrated in FIG. 7F is the following one:

$$\begin{pmatrix} 1 & 0 & 1 & 0 & 0 & 0 & 0 & 0 \\ 0 & 0 & 0 & 0 & 0 & 0 & 0 & 1 \\ 0 & 1 & 0 & 0 & 1 & 0 & 0 & 0 \\ 0 & 1 & 0 & 0 & 0 & 0 & 1 & 0 \\ 0 & 0 & 1 & 0 & 0 & 0 & 0 & 1 \\ 0 & 0 & 0 & 0 & 0 & 1 & 1 & 1 \\ 1 & 0 & 0 & 0 & 0 & 0 & 0 & 0 \end{pmatrix}$$

According to an embodiment of the present invention, the information provided by the histogram map can be advantageously compressed using an entropic coding optimized based on the statistical behavior of exemplary rank-1 support histograms learned from the analysis of a large number of training images.

From such analysis it has been found that the locations of the keypoints KP within the generic image are such to entail a common statistical distribution of the "1" within the matrix of the histogram map.

The entropic coding is carried out in the following way.

The matrix of the histogram map is scanned (e.g., column by column) so as to subdivide it into a plurality of words each having a same length x. Based on the statistical analysis carried out on the training images, a word histogram is generated including a bin for each possible value the x-tuple of the generic word may take, with the frequency of each bin that indicates the probability that the x-tuple of the word takes the value associated with such bin. Briefly, such statistical analysis has been carried out by making the assumption that the elements of the matrix of the histogram map are independent of each another. By analyzing a very high number of training images, it can be identified which is the probability that a "1" occurs in the matrix every n "0"; then, the word histogram is generated based on such probability.

Figure 8B:
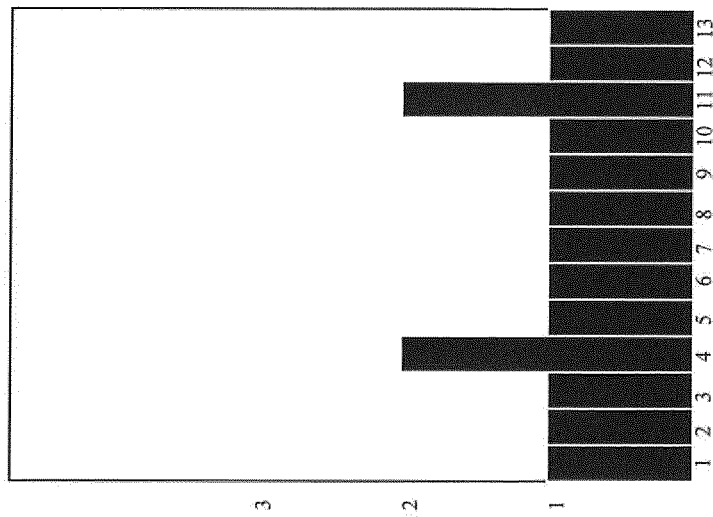
FIG. 8B illustrates an example of a histogram map.
Figure 8A:
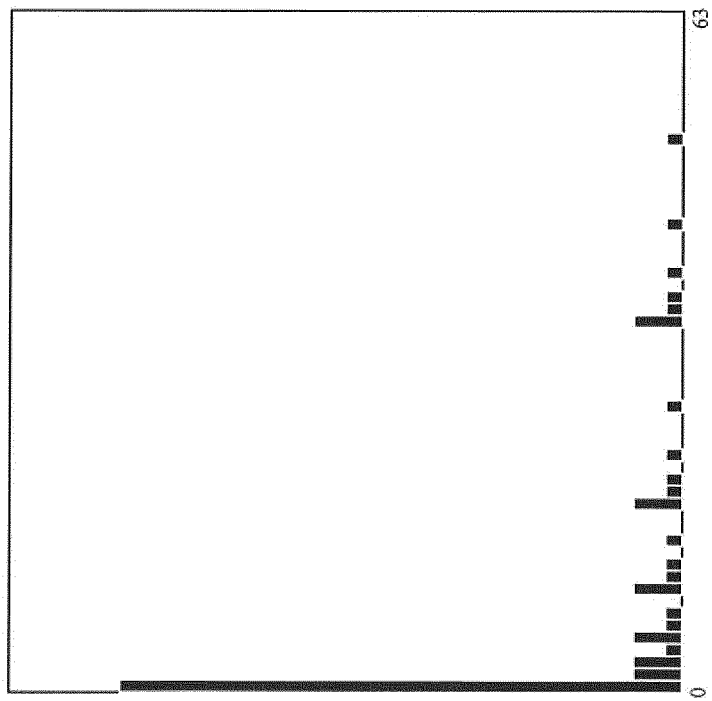
FIG. 8A illustrates an example of a word histogram.

FIG. 8A illustrates an example of a word histogram in which the length x of the words is equal to six, and wherein each bin is identified by the decimal value of the corresponding x-tuple value. As expected, the highest frequency corresponds to the x-tuple (0,0,0,0,0,0), since there is a very higher probability that the generic cell of the rank-1 support does not include any keypoint KP. The following highest probability is the one corresponding to a single keypoint KP for cell (x-tuple (1,0,0,0,0,0), (0,1,0,0,0,0), (0,0,1,0,0,0), (0,0,0,1,0,0), (0,0,0,0,1,0), (0,0,0,0,0,1)), then the one corresponding to two keypoints KP for cell, and so on.

The words are encoded with an entropic coding technique (e.g., the Huffman technique or the Arithmetic coding technique) by using for each word a coded word $bc_i$ (i=1, 2, ...) having a number of bits that depends on the probability of the corresponding bin in the word histogram. The higher the probability of the word, the smaller the number of bits of the coded word $bc_i$ used to encode such word.

The other information that can be extracted from the histogram over the rank-1 support regards the number of keypoints KP which are included in each cell of the histogram map comprising at least one keypoint KP. Such information is arranged in a corresponding histogram, referred to as histogram count. Each bin of the histogram count corresponds to a corresponding one among the cells of the rank-1 support that includes at least one keypoint KP. The histogram count lists for each bin the number of keypoints KP included in the corresponding cell. The histogram map of the example at issue is illustrated in FIG. 8B, wherein 11 cells includes a single keypoint KP each and two cells include two keypoints KP each. The bins of the histogram map of FIG. 8B are ordered following a column-wise scan of the rank-1 support.

The keypoint counting information provided by the histogram count is encoded into a set of coded words $w_j$ (j=1, 2, ...) of different lengths, with each coded word $w_j$ of the set that indicates which bin(s) of a respective set of histogram count bins correspond to a number of keypoints KP greater than or equal to a certain value.

More specifically, if the highest number of keypoints KP counted within each bin is equal to Nmax, such set of coded words $w_j$ comprises a number of coded words $w_j$ equal to Nmax-2. The generation of each coded word $w_j$ is carried out by performing a corresponding one among a set of Nmax-2 procedure steps. According to an embodiment of the present invention, such procedure steps are described hereinbelow.

Step 1—A first coded word $w1$ is set to include an element for each bin of the histogram map. Therefore, the first coded word $w1$ includes a number of elements equal to the number bins of the histogram map. Each element of the first coded word $w1$ is set to a first value (e.g., "1") if the corresponding bin of the histogram count corresponds to a number of keypoints KP higher than one, otherwise is set to a second value (e.g., "0"). If Nmax is higher than 2, a second step is performed for generating a second coded word $w2$, otherwise the process is termined. In the latter case, the whole information provided by the histogram count results to be coded with the first coded word $w1$ only.

Step j (j>1)—A j-th coded word $w_j$ is generated. The j-th coded word $w_j$ is set to include an element for each bin of the histogram map including more than j keypoints KP. Therefore, the j-th coded word $w_j$ includes a number of elements equal to or lower than the j−1 coded word $w(j-1)$. Each element of the j-th coded word $w_j$ is set to the first value if the corresponding bin of the histogram count corresponds to a number of keypoints KP higher than j, otherwise is set to the second value. If Nmax is higher than j+1, a (j+1)-th step is performed, for generating a (j+1)-th coded word $w(j+1)$, otherwise the process is termined. In the latter case, the whole information provided by the histogram count is coded with the coded words $w1$–$w_j$.

The compression operations carried out in phase 150 of the extraction procedure 100 (see FIG. 1) allow to obtain for the coordinates C of the keypoints KP belonging to the subset SUB a corresponding compressed coordinate set CC comprising:
- the array r and the array c;
- the coded words $bc_i$, and
- the coded words $w_j$.

The amount of data required for managing (memorizing and/or transmitting) the compressed coordinate set CC is sensibly lower than the amount of data required for managing the set of (uncompressed) coordinates C.

Figure 9:
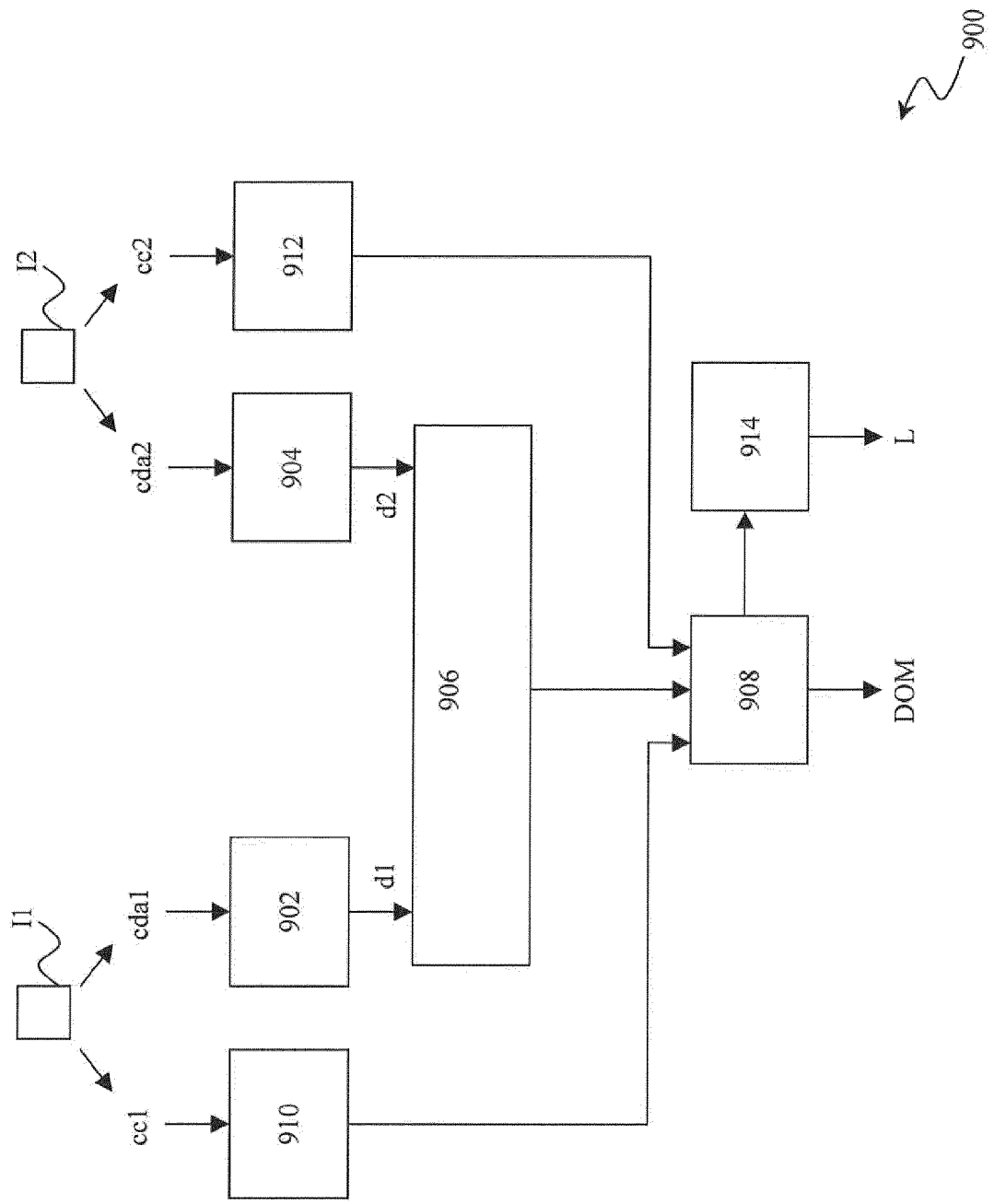
FIG. 9 illustrates in terms of functional blocks a matching procedure directed to perform the comparison between two images according to an embodiment of the present invention.

Matching Procedure (FIG. 9)

FIG. 9 illustrates in terms of functional blocks an image analysis procedure according to an embodiment of the present invention, hereinafter referred to as "matching procedure" and identified with the reference 900, directed to perform the comparison between two images I1, I2, by exploiting for each image a respective optimal subset of keypoints and the corresponding compressed descriptors and coordinates generated with the extraction procedure 100 of FIG. 1.

The steps of the matching procedure 900 may be carried out by proper processing units; for example, each processing unit may be a hardware unit specifically designed to perform one or more steps of the procedure. A possible scenario may provide for a user (client side) which desires to exploit an image comparison service (server side) for comparing the image I1 with the image I2. In this case, the images I1 and I2 may be processed at the client according to the extraction procedure 100 of FIG. 1 for the generation of the optimal subset of keypoints and the corresponding compressed descriptors and coordinates; then, the optimal subset of keypoints and the corresponding compressed descriptors and coordinates are sent to the server, which performs the matching procedure 900 exploiting the received data and then provides the results to the client. In this case, the extraction procedure 100 may be carried out by processing units located at the client, e.g., by means of a user's smartphone, while the matching procedure 900 may be carried out by processing units located at the server, e.g., by means of one or more server units adapted to offer image comparison services. Another possible scenario may provide instead that the matching procedure 900 is directly performed at the client. Mixed scenarios are also contemplated, in which the matching procedure 900 is carried out at the client with the compressed descriptors and coordinates sent by the server.

The compressed coordinates of the image I1 are identified with reference CC1, while the compressed descriptors of the image I1 are identified with reference CDA1. Similarly, the compressed coordinates of the image I2 are identified with reference CC2, while the compressed descriptors of the image I2 are identified with reference CDA2.

The compressed descriptors CDA1 of the first image I1 are decompressed in order to retrieve corresponding (decompressed) descriptors D1 (phase 902). Similarly, the compressed descriptors CDA2 of the second image I2 are decompressed in order to retrieve corresponding (decompressed) descriptors D2 (phase 904). The decompression of the descriptors may be carried out by means of reversed versions of the compression operations performed in phase 140 of the extraction procedure 100. Making reference to descriptors of the SIFT type, after phases 902 and 904 the descriptors D1 and D2 are thus represented by corresponding descriptor arrays formed by 128 sub-elements.

At phase 906, matches among descriptors D1 of the first image I1 and descriptors D2 of the second image I2 are formed by exploiting any one among the feature matching algorithms known in the art, such as for example the Euclidean distance ratio test.

Then, at phase 908, geometric verification operations are performed for ascertaining which matches among those formed at phase 906 are correct (inliers) and which matches are uncorrected (outliers). As it is known to those skilled in the art, an operation of this type requires, in addition to the descriptors, the coordinates of each keypoint whose corresponding descriptor has been matched with the descriptor of another one keypoint. For this purpose, the compressed coordinates CC1 of image I1 and the compressed coordinates CC2 of the image I2 should be decompressed as well, for example by means of reversed versions of the compression operations performed in phase 150 of the extraction procedure 100. The phase dedicated to the decompression of the compressed coordinates CC1 is identified in FIG. 9 with reference 910, while the phase dedicated to the decompression of the compressed coordinates CC2 is identified in FIG. 9 with reference 912. Once the inliers have been identified, the geometric verification may provide as a result a parameter DOM indicative of the degree of match between image I1 and I2. For example, if such parameter DOM is higher than a predetermined threshold, the images I1 and I2 are reputed to depict a same object(s)/scene(s).

Additionally, localization operations (phase 914) may be further carried out for retrieving the location(s) L of such same object(s)/scene(s) within the two images I1, I2.

Making reference to the previously mentioned client-server image comparison scenario, since the matching procedure 900 is configured to operate with a reduced number of keypoints (only the ones belonging to the subset SUB generated by means of the extraction procedure 100), and since the descriptors and the coordinates of such reduced number of keypoints are received in a compressed way, with the proposed solution the overall amount of data to be sent from the client to the server is drastically reduced compared to the known solutions.

Figure 10:
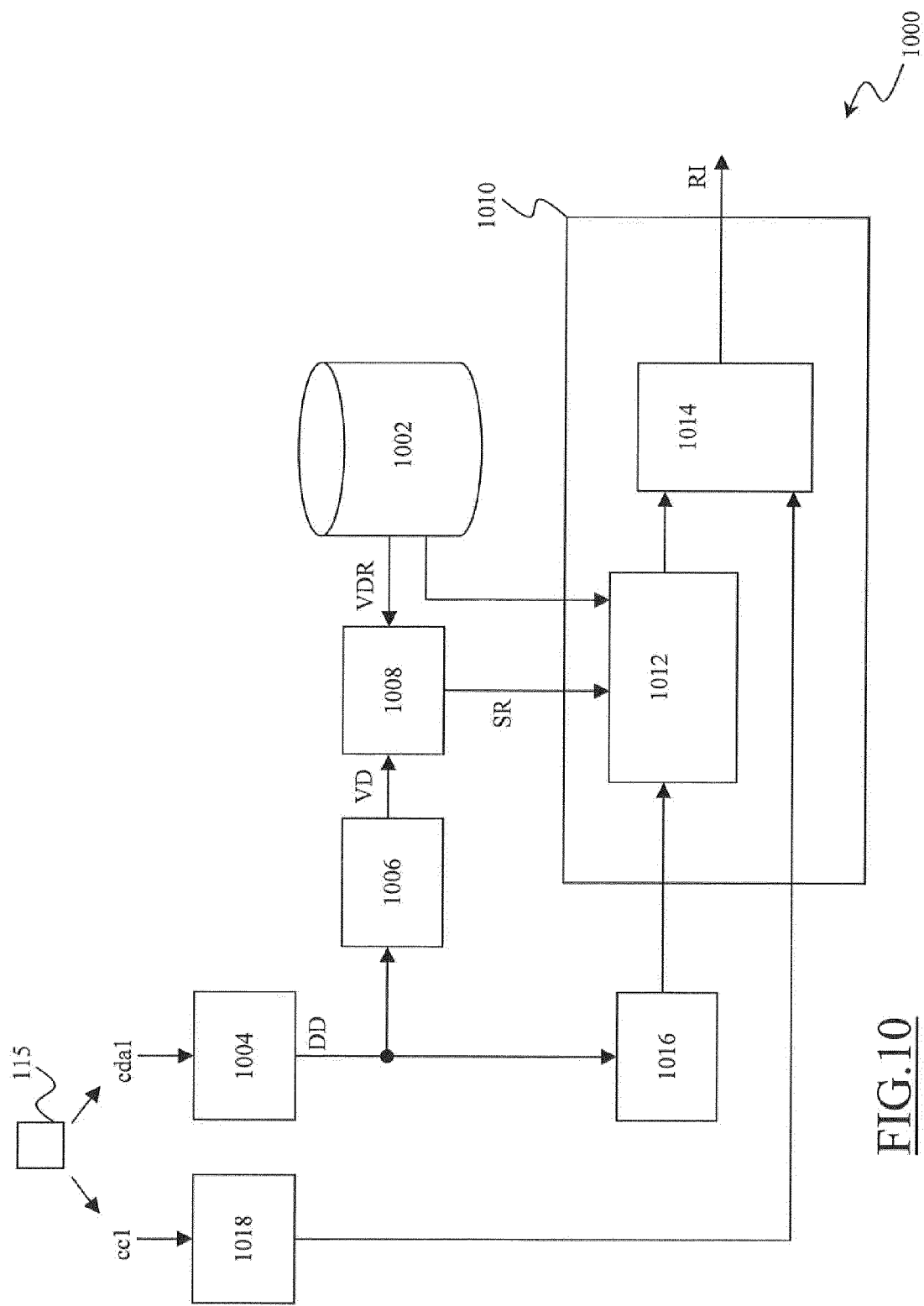
FIG. 10 illustrates in terms of functional blocks a retrieval procedure directed to retrieve from a model database a model image depicting the same object/scene depicted in the query image according to an embodiment of the present invention.

Retrieval Procedure (FIG. 10)

FIG. 10 illustrates in terms of functional blocks an image analysis procedure according to an embodiment of the present invention, hereinafter referred to as "retrieval procedure" and identified with the reference 1000, in which a query image—such as the query image 115 of FIG. 1—depicting an object/scene to be recognized is compared with a plurality of model images—each one depicting a respective known object/scene—stored in a model database, in order to retrieve the model image(s) depicting the same object/scene depicted in the query image.

Like the matching procedure 900 of FIG. 9, the steps of the retrieval procedure 1000 may be carried out by proper processing units; for example, each processing unit may be a hardware unit specifically designed to perform one or more steps of the procedure. A typical scenario may provide for an user (client side) which desires to exploit an image recognition service (server side) in order to automatically recognize an object/scene depicted in a query image 115. In this case, the query image 115 may be processed at the client according to the extraction procedure 100 of FIG. 1 for the generation of the optimal subset of keypoints SUB and the corresponding compressed descriptors CDA and coordinates CC; then, the optimal subset of keypoints and the corresponding compressed descriptors and coordinates are sent to the server, which performs the retrieval procedure 1000 exploiting the received data and then provides the results to the client. The plurality of model images to be used for the recognition of the object/scene depicted in the query image 115 are stored in a model database 1002, which is located at server side.

The compressed descriptors CDA are decompressed in order to retrieve corresponding (decompressed) descriptors DD (phase 1004). The decompression of the descriptors may be carried out by means of reversed versions of the compression operations performed in phase 140 of the extraction procedure 100. Again, making model to descriptors of the SIFT type, after phase 1004 the descriptors DD are thus represented by corresponding descriptor arrays formed by 128 sub-elements.

Since a standard object recognition procedure typically require the execution of comparison operations between the query image and a very high number of model images (for example, the model images included in the model database 1002 may be a few millions), such procedure is both time and memory consuming. For this purpose, a known solution provides for performing such comparison operations in two distinct phases. Instead of directly comparing the descriptors of the query image with the descriptors of all the model images, a fast, rough, comparison is preliminarly made by among visual words extracted from the query image and visual words extracted from the model images; then, the (refined) comparison of the descriptors is carried out only among the descriptors of the query image and the descriptors of a reduced set of model images chosen based on the preliminary comparison. A visual word is an array obtained by performing a vector quantization of a descriptor; in other words, each visual word is a codeword of a visual codebook. The generation of the visual words is carried out for each descriptor of the query image and each descriptor of the model images. For example, the preliminary comparison is carried out by counting the number of visual words in common between the query image and each model image. Then, for each model image, a similitude rank is calculated based on the counts of the number of visual words in common. Similar considerations apply if the similitude rank is generated by comparing the visual words using alternative methods. In this way, the refined comparison between descriptors may be advantageously carried out only among the query image and the model images having the highest similitude ranks (i.e., the ones having the highest numbers of visual words in common with the query image). This approach, which is derived from the text analysis field, is also known as "ranking by means of Bag of Features (BoF)".

Making reference again to FIG. 10, in order to allow the carrying out of the ranking by means of BoF, visual words VD for each descriptor of the query image and visual words VDR for each descriptor of each model image have to be generated.

It is pointed out that in order to allow the comparison between visual words, both the visual words VD and the visual words VDR should be generated using a same codebook.

While the visual words VD of the query image 115 have to be generated every time the retrieval procedure 1000 is performed (phase 1006), in order to drastically reduce the operation times, the generation of the visual words VDR of the model images may be advantageously carried out only once, and then the resulting plurality of visual words VDR may be directly stored in the model database 1002; alternatively, the visual words VDR may be periodically updated.

Having generated for each descriptor DD of the query image a corresponding visual word VD, in phase 1008 the ranking by means of BoF procedure is then carried out. In this way, for each model image, a rank index is calculated by counting the number of visual words VDR of such model image which are also visual words VD of the query image. Such counting may be carried out using the known ranking by means of BoF implementation also known as Invertedindex. However, similar considerations apply in case different implementations are applied. Once all the rank indexes have been calculated, a list is generated in which the model images of the database are sorted according to a rank index decreasing order. Then, a set SR of model images having the highest rank index values is selected for being subjected to the subsequent (refined) comparison operations.

It is pointed out that since according to an embodiment of the present invention the number of descriptors of each image is advantageously reduced, corresponding only to the optimal subset SUB of keypoints which are considered relevant (see phase 130 of the extraction procedure 100 of FIG. 1), the amount of data required for carrying out the ranking by means of BoF procedure (phase 1008) which has to be loaded in the working memory (e.g., in RAM banks located on the server side) is strongly reduced, drastically improving the speed of the process. Moreover, since the comparisons are made by taking into consideration only the descriptors of the keypoints reputed relevant, the precision of the comparison is increased, because the noise is reduced. In order to further improve the speed and the precision, optimal subset including a reduced number of descriptors are also generated for each model image included in the model database 1002.

It has been found that the number of keypoints forming the optimal subset SUB strongly influence the outcome of the ranking by means of BoF. Indeed, with a same number of considered images, the probability that the object/scene depicted in the query image 115 is also depicted in at least one of the model images belonging to the selected set SR of model images increases as the number of keypoints of the optimal subset SUB decreases. However, if such number of keypoints of the optimal subset SUB falls below a lower threshold, the performances of the procedure decrease, since the number of keypoints included in the subset SUB become too small for satisfactorily representing each image.

At this point, a second, refined comparison is carried out between the query image 115 and the set SR of model images (phase 1010). One of the already known feature matching procedures may be employed for matching descriptors DD of the query image 115 with descriptors of the model images of the set SR (sub-phase 1012), e.g., by calculating Euclidean distances among the descriptors, and then a geometric verification is performed for ascertaining which matching are inliers and which are outliers (sub-phase 1014). In this way, if it exists, the model image RI of the set SR depicting an object/scene depicted also in the query image 115 is retrieved at the end of the phase.

According to an embodiment of the present invention, instead of directly performing feature matching operations on the descriptors DD of the query image 115 and on the descriptors of the model images of the set SR, the feature matching operations are carried out on compressed versions thereof obtained by subdividing the corresponding descriptor arrays into sub arrays and compressing each sub-array by means of a codebook based on vector quantization. For this purpose, the descriptors DD of the query image 115 are compressed at phase 1016, for example by subdividing the corresponding descriptor arrays in four sub-arrays and compressing each one of said four sub-arrays with a respective codebook. Similarly to the generation of the visual words, the model database 1002 stores for each model image corresponding pre-calculated compressed versions thereof, which have been compressed using the same codebooks used for compressing the descriptors DD of the query image 115. According to this embodiment, the feature matching (sub-phase 1012) can be performed in a very fast and efficient way. Indeed, since the feature matching is carried out in the compressed space (both the descriptors of the query image and of the model images are compressed), and since the number of descriptors to be considered is reduced (corresponding only to the keypoints of the optimal subset), it is possible to directly load in the main memory also the data representing the model images of the model database. Moreover, since the compression of the descriptor arrays has been carried out by subdividing the descriptor arrays in sub-arrays, thus strongly reducing the number of codewords of the corresponding codebooks, a list including all the possible Euclidean distances among each codeword of each codebook may by pre-calculated in advance, and loaded in the main memory, further increasing the speed of sub-phase 1012. Similar considerations apply if the feature matching is carried out by exploiting a different algorithm which does not make use of the Euclidean distances.

According to an embodiment of the present invention, sub-phase 1012 may be further improved by compressing the sub-arrays of each descriptor using a same codebook, using an approach similar to that used in phase 140 of the extraction procedure 100 of FIG. 1.

Since the geometric verification (sub-phase 1014) requires, in addition to the descriptors, the coordinates of the keypoints whose corresponding descriptors have been matched with descriptors of another keypoints, the compressed coordinates CC of the keypoints of the query image 115 should be decompressed as well (phase 1018).

The previous description presents and discusses in detail several embodiments of the present invention; nevertheless, several changes to the described embodiments, as well as different invention embodiments are possible, without departing from the scope defined by the appended claims.

The invention claimed is:

1. A method for processing an image, comprising:
identifying a first group of keypoints in the image;
for each keypoint of the first group:
   a) identifying at least one corresponding keypoint local feature related to said each keypoint;
   b) for said at least one keypoint local feature, calculating a corresponding local feature relevance probability;
   c) calculating a keypoint relevance probability based on the local feature relevance probabilities of said at least one local feature;
selecting keypoints, among the keypoints of the first group, having the highest keypoint relevance probabilities to form a second group of keypoints, and
exploiting the keypoints of the second group for analysing the image, wherein:
the local feature relevance probability calculated for a local feature of a keypoint is obtained by comparing the value assumed by said local feature with a corresponding reference statistical distribution of values of said local feature.

2. A method for generating a reference statistical distribution of values of a keypoint local feature to be used in the method according to claim 1, comprising:
collecting, among a plurality of reference keypoints identified in a plurality of reference image pairs, the local feature values corresponding to those reference keypoints of each reference image pair that have been ascertained to involve a correct feature match between the reference images of such pair.

3. The method of claim 1, wherein each said corresponding reference statistical distribution is statistically equivalent to a corresponding statistical distribution generated by collecting, among a plurality of reference keypoints identified in a plurality of reference image pairs, the local feature values corresponding to those reference keypoints of each reference image pair that have been ascertained to involve a correct feature match between the reference images of such pair.

4. The method of claim 1, wherein said at least one of keypoint local feature related to said each keypoint comprises at least one among:

the coordinates of the keypoint;
the scale at which the keypoint has been identified;
the dominant orientation of the keypoint;
the peak of the keypoint, and
a descriptor of the keypoint.

5. The method of claim 3, wherein:
each reference statistical distribution is arranged in the form of a corresponding histogram having a plurality of bins, each bin corresponding to a predefined range of values of the corresponding local feature, and the frequency of each bin corresponding to a ratio between:
   a) the number of reference keypoints that have been ascertained to involve a correct feature match and having a value of the corresponding local feature that falls within said bin, and
   b) the total number of reference keypoints having a value of the corresponding local feature that falls within said bin,
said calculating the local feature relevance probability for a local feature of a keypoint comprises:
   c) inspecting the histogram corresponding to such local feature in order to identify the bin thereof fitting the value assumed by the local feature of the keypoint, and
   d) setting the local feature relevance probability to the frequency of the identified bin.

6. The method of claim 1, wherein said calculating a keypoint relevance probability of a keypoint of the first group includes combining the local feature relevance probabilities of each one of said at least one local feature of the corresponding keypoint.

7. The method of claim 6, wherein said calculating a keypoint relevance probability of a keypoint of the first group includes multiplying one to another the local feature relevance probabilities of each one of said at least one local feature of the corresponding keypoint.

8. A system for processing an image, comprising:
a first processing unit configured to identify a first group of keypoints in the image;
a second processing unit configured to perform the following operations for each keypoint of the first group:
   a) identifying at least one corresponding keypoint local feature related to said each keypoint;
   b) for said at least one keypoint local feature, calculating a corresponding local feature relevance probability;
   c) calculating a keypoint relevance probability based on the local feature relevance probabilities of said at least one local feature;
a third processing unit configured to select keypoints, among the keypoints of the first group, having the highest keypoint relevance probabilities to form a second group of keypoints, and
a fourth processing unit configured to exploit the keypoints of the second group for analysing the image, wherein:
the local feature relevance probability calculated for a local feature of a keypoint is obtained by comparing the value assumed by said local feature with a corresponding reference statistical distribution of values of said local feature.

\* \* \* \* \*